United States Patent
Matsunaga et al.

(10) Patent No.: US 9,647,411 B2
(45) Date of Patent: May 9, 2017

(54) METHOD OF CONTROLLING WAVELENGTH OF LASER BEAM AND LASER APPARATUS

(71) Applicant: Gigaphoton Inc., Tochigi-ken (JP)

(72) Inventors: Takashi Matsunaga, Tochigi-ken (JP); Takahito Kumazaki, Tochigi-ken (JP); Osamu Wakabayashi, Tochigi-ken (JP)

(73) Assignee: GIGAPHOTON INC., Tochigi (JP)

( * ) Notice: Subject to any disclaimer, the term of this patent is extended or adjusted under 35 U.S.C. 154(b) by 0 days.

(21) Appl. No.: 14/818,939

(22) Filed: Aug. 5, 2015

(65) Prior Publication Data

US 2015/0340837 A1    Nov. 26, 2015

Related U.S. Application Data

(63) Continuation of application No. PCT/JP2014/054229, filed on Feb. 21, 2014.

(30) Foreign Application Priority Data

Mar. 27, 2013  (JP) ................................. 2013-066813

(51) Int. Cl.
| | | |
|---|---|---|
| *H01S 3/10* | (2006.01) | |
| *H01S 5/00* | (2006.01) | |
| *H01S 3/08* | (2006.01) | |
| *H01S 3/13* | (2006.01) | |
| *H01S 3/137* | (2006.01) | |

(Continued)

(52) U.S. Cl.
CPC ........ *H01S 3/08004* (2013.01); *H01S 3/1305* (2013.01); *H01S 3/137* (2013.01); *H01S 3/2251* (2013.01); *H01S 3/2256* (2013.01); *H01S 3/2366* (2013.01)

(58) Field of Classification Search
CPC .... H01S 3/08004; H01S 3/1305; H01S 3/137; H01S 3/2256; H01S 3/2366; H01S 3/2251

See application file for complete search history.

(56) References Cited

U.S. PATENT DOCUMENTS

| | | | |
|---|---|---|---|
| 4,926,428 A | 5/1990 | Kajiyama et al. | |
| 5,373,515 A * | 12/1994 | Wakabayashi | H01S 3/137 |
| | | | 356/519 |

(Continued)

FOREIGN PATENT DOCUMENTS

| | | |
|---|---|---|
| JP | 3109004 B2 | 11/2000 |
| JP | 3247659 B2 | 1/2002 |

(Continued)

OTHER PUBLICATIONS

International Search Report for PCT/JP2014/054229 dated May 20, 2014.

*Primary Examiner* — Yuanda Zhang
(74) *Attorney, Agent, or Firm* — Studebaker & Brackett PC

(57) ABSTRACT

There is provided a method of controlling the wavelength of a laser beam. The method includes measuring an absolute wavelength of the laser beam; calculating a difference between a reference wavelength and the absolute wavelength of the laser beam; and adjusting the reference wavelength of the laser beam based on the difference between the reference wavelength and the absolute wavelength of the laser beam, at an interval shorter than an interval for which the absolute wavelength of the laser beam is measured.

22 Claims, 21 Drawing Sheets

(51) Int. Cl.
*H01S 3/225* (2006.01)
*H01S 3/23* (2006.01)

(56) References Cited

U.S. PATENT DOCUMENTS

| | | | |
|---|---|---|---|
| 5,450,207 A | 9/1995 | Fomenkov | |
| 5,978,394 A | 11/1999 | Newman et al. | |
| 6,243,163 B1* | 6/2001 | Wakabayashi | G01J 3/28 356/318 |
| 6,628,682 B1* | 9/2003 | Takehisa | H01S 3/225 372/29.022 |
| 6,807,205 B1* | 10/2004 | Albrecht | H01S 3/225 372/20 |
| 8,440,951 B2 | 5/2013 | Furuya et al. | |
| 2004/0012844 A1* | 1/2004 | Ohtsuki | B23K 26/0643 359/341.1 |
| 2007/0273852 A1* | 11/2007 | Arai | G03F 7/7005 355/44 |
| 2011/0147566 A1 | 6/2011 | Furuya et al. | |
| 2013/0170508 A1* | 7/2013 | Suzuki | H01S 3/13 372/5 |

FOREIGN PATENT DOCUMENTS

| | | |
|---|---|---|
| JP | 2006-066933 A | 3/2006 |
| WO | 89/02068 A1 | 3/1989 |
| WO | 2010/004749 A1 | 1/2010 |

* cited by examiner

METHOD OF CONTROLLING WAVELENGTH OF LASER BEAM AND LASER APPARATUS

CROSS-REFERENCES TO RELATED APPLICATIONS

This application claims the benefit of Japanese Patent Application No. 2013-066813, filed Mar. 27, 2013, which is incorporated herein by reference.

TECHNICAL FIELD

The present disclosure relates to a method of controlling the wavelength of a laser beam, and a laser apparatus.

BACKGROUND ART

The miniaturization and increased levels of integration of semiconductor integrated circuits have led to a demand for increases in the resolutions of semiconductor exposure devices (hereinafter referred to as "exposure device"). Accordingly, advances are being made in the reduction in the wavelengths of light emitted from exposure light sources. Gas laser apparatuses are being used as exposure light sources instead of conventional mercury lamps. At present, a KrF excimer laser apparatus that emits ultraviolet light at a wavelength of 248 nm and an ArF excimer laser apparatus that emits ultraviolet light at a wavelength of 193 nm are being used as gas laser apparatuses for exposure.

As a current exposure technology, immersion exposure has been put to practical use, for reducing the apparent wavelength of an exposure light source by filling the space between the projection lens of an exposure device and a wafer with a liquid, and changing the refractive index of the space. In the case where immersion exposure is carried out using an ArF excimer laser apparatus as the exposure light source, the wafer is irradiated with ultraviolet light at a wavelength of 134 nm in the liquid. This technology is referred to as ArF immersion exposure or ArF immersion lithography.

The spontaneous oscillation spectral linewidth of a KrF or ArF excimer laser apparatus is as wide as 350 to 400 pm, and therefore a laser beam (ultraviolet light) which is reduced and projected on the wafer by the projection lens in the exposure device exhibits chromatic aberration. As a result, the resolution is dropped. It is therefore necessary to narrow the spectral bandwidth of the laser beam emitted from the gas laser apparatus until the chromatic aberration reaches a level that can be ignored. The spectral bandwidth may be referred to as a spectral width. Accordingly, the spectral width has been narrowed by providing a line narrowing module (LNM) having line narrowing elements in the laser resonator of the gas laser apparatus. Here, the line narrowing elements may be an etalon, a grating, and so forth. A laser apparatus having a narrowed spectral width in this manner is referred to as a line narrowing laser apparatus.

CITATION LIST

Patent Literature

PTL1: International Publication No. 89/02068
PTL2: U.S. Pat. No. 4,926,428
PTL3: Japanese Patent No. 3109004
PTL4: U.S. Pat. No. 5,450,207
PTL5: Japanese Patent No. 3247659
PTL6: U.S. Pat. No. 5,978,394

SUMMARY OF INVENTION

A method of controlling a wavelength of a laser beam includes measuring an absolute wavelength of the laser beam; calculating a difference between a reference wavelength and the absolute wavelength of the laser beam; and adjusting the reference wavelength of the laser beam based on the difference between the reference wavelength and the absolute wavelength of the laser beam, at an interval shorter than an interval for which the absolute wavelength of the laser beam is measured.

A laser apparatus includes a laser resonator configured to output a laser beam; a spectroscope configured to measure a relative wavelength of the laser beam with respect to a reference wavelength of the laser beam; an absolute wavelength detector configured to measure an absolute wavelength of the laser beam; and a controller configured to calculate a difference between the reference wavelength and the absolute wavelength of the laser beam, and to adjust the reference wavelength of the laser beam based on the difference, at an interval shorter than an interval for which the absolute wavelength of the laser beam is measured.

BRIEF DESCRIPTION OF DRAWINGS

Hereinafter, selected embodiments of the present disclosure will be described with reference to the accompanying drawings.

DESCRIPTION OF EMBODIMENTS

Table of Contents

Figure 1:
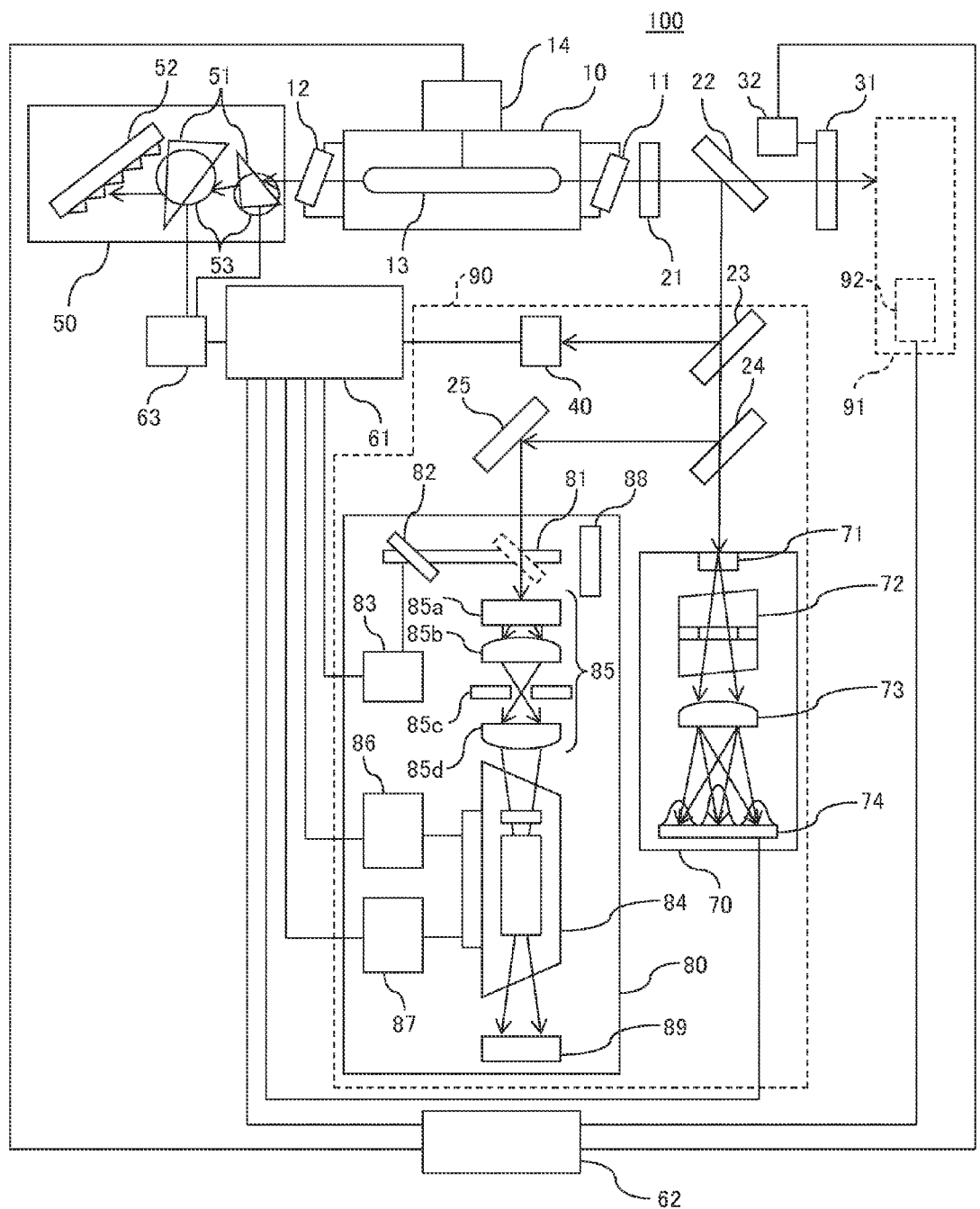
FIG. 1 is a drawing illustrating an exemplary laser apparatus.

1. An exemplary laser apparatus
1.1 An example of configuration of the exemplary laser apparatus
1.2 An example of operation of the exemplary laser apparatus
2. An exemplary method of controlling the wavelength of a laser
beam according to related art
2.1 Flowcharts according to related art
2.2 Problems with related art
3. Embodiments of the method of controlling the wavelength of a
laser beam
3.1 Embodiment 1
3.2 Embodiment 2
3.3 Embodiment 3
3.4 Embodiment 4
3.5 Embodiment 5

Hereinafter, selected embodiments of the present disclosure will be described in detail with reference to the accompanying drawings. The embodiments to be described below are merely illustrative in nature and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein.

1. An Exemplary Laser Apparatus 1.1 An Example of Configuration of the Exemplary Laser Apparatus FIG. 1 is a drawing illustrating an exemplary laser apparatus. In FIG. 1, the straight lines without arrows indicate electrical connection between components. Meanwhile, the straight lines with arrows indicate the travelling direction of a laser beam.

The exemplary laser apparatus illustrated in FIG. 1 may be a line narrowing laser apparatus 100 including a system for controlling the absolute wavelength of a laser beam. The line narrowing laser apparatus 100 including the system for controlling the absolute wavelength may be used with an exposure device 91. The line narrowing laser apparatus 100 may be an excimer laser apparatus. The excimer laser apparatus may be an argon fluoride (ArF) excimer laser apparatus, or a krypton fluoride (KrF) excimer laser apparatus. The line narrowing laser apparatus 100 may be a solid-state laser apparatus including a wavelength-variable ultraviolet laser. The wavelength-variable ultraviolet solid-state laser apparatus may be a solid-state laser apparatus formed by combining a Ti-sapphire laser with a nonlinear crystal.

The line narrowing laser apparatus 100 may include a laser chamber 10, an output coupling mirror 21, a first beam splitter 22, a laser exit shutter 31, a shutter driver 32, a line narrowing module (LNM) 50, a wavelength detection system 90, a wavelength controller 61, a laser controller 62, and a first driver 63. The output coupling mirror 21 and the line narrowing module 50 may constitute a laser resonator configured to output a laser beam in the line narrowing laser apparatus 100.

The line narrowing laser apparatus 100 may be a single-stage line narrowing ultraviolet laser. The line narrowing laser apparatus 100 may be mounted, as a master oscillator (MO) used with a power amplifier (PA) that amplifies a laser beam. The line narrowing laser apparatus 100 may be mounted in the double-stage system including a power oscillator (PO).

The laser chamber 10 may be provided on the optical path of the laser resonator. The laser chamber 10 may include a first window 11, a second window 12, a pair of electrodes 13, and a power supply 14. The laser chamber 10 may contain laser medium. When the line narrowing laser apparatus 100 is an ArF excimer laser apparatus, the laser medium may be mixed gas containing argon (Ar) gas, fluorine ($F_2$) gas, and neon (Ne) gas. Meanwhile, when the line narrowing laser apparatus 100 is a KrF excimer laser apparatus, the laser medium may be mixed gas containing krypton (Kr) gas, fluorine ($F_2$) gas, and neon (Ne) gas. The first window 11 and the second window 12 may be provided to allow a laser beam to pass therethrough. The pair of electrodes 13 may be provided to face the direction perpendicular to the plane of FIG. 1, in the laser chamber 10. The longitudinal direction of the pair of electrodes 13 may match the direction of the optical path of the laser resonator. The pair of electrodes 13 may be connected to the power supply 14. The power supply 14 may apply a voltage to the pair of electrodes 13 such that the laser medium discharges electricity between the pair of electrodes 13 and the laser beam emitted from the laser medium is amplified due to the stimulated emission.

The output coupling mirror 21 may be coated with a film that allows part of the laser beam to be reflected, and the remaining laser beam to transmit therethrough.

The first beam splitter 22 may be provided on the optical path of the laser beam outputted from the output coupling mirror 21. The first beam splitter 22 may be provided to transmit part of the laser beam outputted from the output coupling mirror 21 to the laser exit shutter 31. The first beam splitter 22 may be provided to reflect the remaining laser beam to the wavelength detection system 90.

The laser exit shutter 31 may be provided to allow the laser beam having passed through the first beam splitter 22 to pass to the exposure device 91, or be provided to block the laser beam having passed through the first beam splitter 22. The laser exit shutter 31 may be connected to the shutter driver 32.

The shutter driver 32 may be provided to control the opening and closing of the laser exit shutter 31 according to a command from the laser controller 62. The shutter driver 32 may be connected to the laser exit shutter 31 and the laser controller 62.

The line narrowing module 50 may be configured to narrow the wavelength width (spectral width) of a laser beam. The line narrowing module 50 may include a plurality of prisms 51, a grating 52, and one or more rotation stages 53. The number of the plurality of prisms 51 may be two. The plurality of prisms 51 may be provided to function as a beam expander. The grating 52 may be arranged in a Littrow configuration such that the angle of diffraction of the laser beam matches the angle of incidence of the laser beam. The number of the one or more rotation stages 53 may be two. At least one of the plurality of prisms 51 may be set on either the one or more rotation stages 53. The angle of incidence of the laser beam on the grating 52 may be changed by rotating at least one of the plurality of prisms 51 on the one or more rotation stages 53.

The wavelength detection system 90 may include a second beam splitter 23, a third beam splitter 24, a first reflecting mirror 25, an optical sensor 40, a spectroscope 70, and an absolute wavelength detector 80.

The second beam splitter 23 may be provided on the optical path of the laser beam reflected from the first beam splitter 22. The second beam splitter 23 may be provided to transmit part of the laser beam having been reflected from the first beam splitter 22 to the third beam splitter 24. The second beam splitter 23 may be provided to reflect the remaining laser beam having been reflected from the first beam splitter 22 to the optical sensor 40.

The third beam splitter 24 may be provided on the optical path of the laser beam having transmitted through the second beam splitter 23. The third beam splitter 24 may be provided to transmit part of the laser beam having transmitted through the second beam splitter 23 to the spectroscope 70. The third beam splitter 24 may be provided to reflect the remaining laser beam having transmitted through the second beam splitter 23 to the first reflecting mirror 25.

The first reflecting mirror 25 may be provided to reflect the laser beam having been reflected from the third beam splitter 24, to the absolute wavelength detector 80.

The optical sensor 40 may be provided to detect the laser beam having been reflected from the second beam splitter 23. The output terminal of the optical sensor 40 may be connected to the wavelength controller 61.

The spectroscope 70 may be provided to receive the laser beam having transmitted through the third beam splitter 24. The spectroscope 70 may be connected to the wavelength controller 61. The spectroscope 70 may be configured to measure a relative wavelength of the laser beam with respect to the reference wavelength of the laser beam which serves as the standard for the control of the wavelength of a laser beam. The spectroscope 70 may be capable of measuring the wavelength of a laser beam per pulse.

The spectroscope 70 may be an etalon spectrometer. In this case, the spectroscope 70 may include a first diffuser element 71, a monitor etalon 72, a first condenser lens 73, and an image sensor 74. The monitor etalon 72 may be, for example, an air-gap etalon. The image sensor 74 may be a line sensor such as a one-dimensional CCD, or a photodiode array. In the spectroscope 70, the first diffuser element 71, the monitor etalon 72, the first condenser lens 73 and the image sensor 74 may be arranged in the order as described.

The first diffuser element 71 may be provided to diffuse the laser beam having transmitted through the third beam splitter 24.

The monitor etalon 72 may be provided to receive the laser beam having been diffused by the first diffuser element 71. The monitor etalon 72 may be provided to interfere with the laser beam having been diffused by the first diffuser element 71.

The first condenser lens 73 may be provided to focus the laser beam having transmitted through the monitor etalon 72 on the image sensor 74.

The image sensor 74 may be provided on the focal plane of the first condenser lens 73. The focal plane of the first condenser lens 73 may have an interference pattern of the laser beam having transmitted through the monitor etalon 72. The image sensor 74 may detect the interference pattern of the laser beam having transmitted through the monitor etalon 72. The square of the radius of the interference pattern generated on the focal plane of the first condenser lens 73 may be proportional to the wavelength of the laser beam. Wavelength A of the laser beam may be represented by an equation $\lambda = \lambda c + \alpha r^2$. Here, r represents the radius of the detected interference pattern of the laser beam; $\lambda c$ represents the center wavelength of the detected interference pattern of the laser beam at which the intensity is maximized (reference wavelength of the laser beam); and a represents a proportional constant. The spectral profile of the laser beam may be detected based on the interference pattern of the laser beam that is detected by the image sensor 74. The center wavelength and the spectral linewidth of the laser beam may be detected, based on the interference pattern of the laser beam that is detected by the image sensor 74. The center wavelength and the width of the spectral line of the laser beam may be detected by an information processor (not shown), or be calculated by the wavelength controller 61.

The spectroscope 70 may include a plurality of etalon spectroscopes having different free spectral ranges.

The spectroscope 70 may include a grating and an image sensor. The grating may be provided to diffract the laser beam having transmitted through the third beam splitter 24. The spectral profile of the laser beam having been diffracted by the grating may be detected by the image sensor. The center wavelength and the width of the spectral line of the laser beam may be detected by the image sensor.

The absolute wavelength detector 80 may be provided to receive the laser beam having been reflected from the first reflecting mirror 25. The absolute wavelength detector 80 may be configured to measure the absolute wavelength of the laser beam. The absolute wavelength detector 80 may be capable of measuring the absolute wavelength of the laser beam more accurately than the spectroscope 70. By using the absolute wavelength detector 80, the wavelength of the laser beam measured by the spectroscope 70 may be controlled.

The absolute wavelength detector 80 may include a uniaxial stage 81, a second reflecting mirror 82, a second driver 83, a laser Galvatron™ 84, an optical system 85, an optogalvanic signal detecting circuit 86, a galvatron power supply 87, a first damper 88 and a second damper 89.

The uniaxial stage 81 may be provided to be able to move the second reflecting mirror 82 provided on the uniaxial stage 81. The uniaxial stage 81 may be connected to the second driver 83.

When the measurement of the absolute wavelength of the laser beam is not performed, the second reflecting mirror 82 may be positioned such that the laser beam reflected from the first reflecting mirror 25 is not incident on the optical system 85 and the laser galvatron 84, but is reflected to the first damper 88. In contrast, when the measurement of the absolute wavelength of the laser beam is performed, the second reflecting mirror 82 may be positioned such that the laser beam reflected from the first reflecting mirror 25 is incident on the optical system 85 and the laser galvatron 84.

The second driver 83 may be provided to control the location of the second reflecting mirror 82 provided on the uniaxial stage 81, according to a command from the wavelength controller 61. The second driver 83 may be connected to the uniaxial stage 81 and the wavelength controller 61.

The laser galvatron 84 may be provided to detect the absolute wavelength of the laser beam by using the optogalvanic effect. The laser galvatron 84 may include a hollow anode and a hollow cathode. The hollow anode and the hollow cathode in the laser galvatron 84 may be provided to be supplied with a voltage. When the line narrowing laser apparatus 100 is an ArF excimer laser apparatus, the material for the hollow cathode of the laser galvatron 84 may contain platinum (Pt). Meanwhile, when the line narrowing laser apparatus 100 is a KrF excimer laser apparatus, the material for the hollow cathode of the laser galvatron 84 may contain ferrum (Fe).

Figure 2:
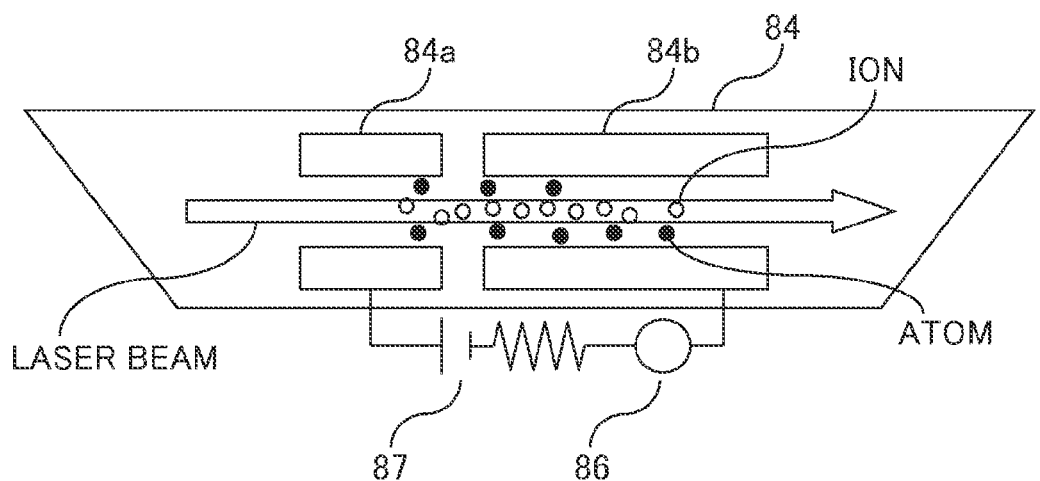
FIG. 2 is a drawing schematically illustrating the configuration and operation of a laser galvatron of the exemplary laser apparatus.
Figure 2:
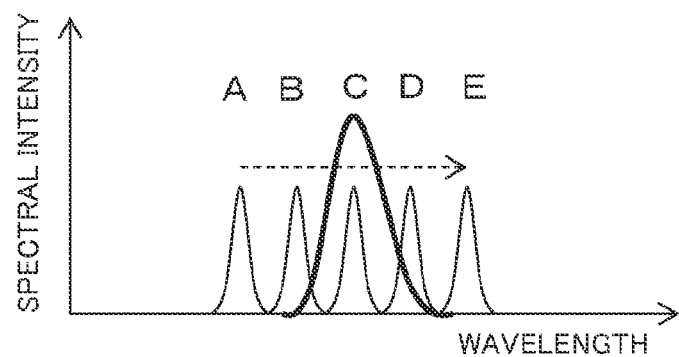
Figure 2:
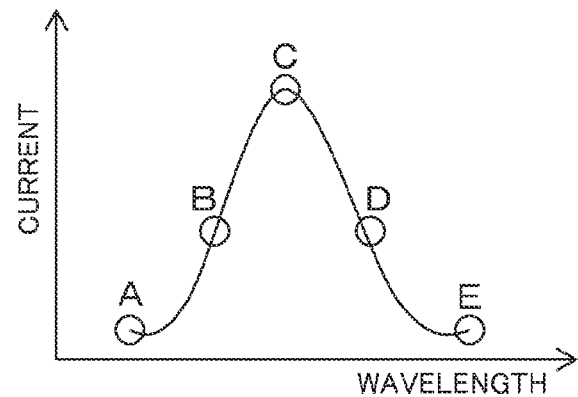

FIG. 2 is a drawing schematically illustrating the configuration and the operation of the laser galvatron of the exemplary laser apparatus.

The laser galvatron 84 illustrated in FIG. 2 may include a hollow anode 84a and a hollow cathode 84b. The optogalvanic signal detecting circuit 86 and the galvatron power supply 87 may be connected to the hollow anode 84a and the hollow cathode 84b. The galvatron power supply 87 may apply a voltage between the hollow anode 84a and the hollow cathode 84b. Then, an electric discharge occurs between the hollow anode 84a and the hollow cathode 84b, and the (metal) material of the hollow cathode 84b is spattered, and therefore vapor of the atoms of the material of the cathode 84b may be generated. The vapor of the atoms of the material may be irradiated with a laser beam. The vapor of the atoms of the material of the cathode 84b may be irradiated with a laser beam having a wavelength for which the atoms of the material of the cathode 84b are resonantly ionized. As a result, the atoms of the material of the cathode 84b are resonantly ionized, and therefore ions of the material may be generated. The ions of the material of the cathode 84b, which are generated by the laser beam, may increase the current flowing between the hollow anode 84a and the hollow cathode 84b (optogalvanic effect). The wavelength (absolute wavelength) for which the atoms of the material of the cathode 84b are resonantly ionized may be determined based on the kind of the atoms of the material of the cathode 84b. As illustrated by A, B, C, D, and E in FIG. 2, the current flowing between the hollow anode 84a and the hollow cathode 84b in the laser galvatron 84 may be detected, changing the wavelength of the laser beam. As illustrated by C in FIG. 2, the wavelength of the laser beam when the current flowing between the hollow anode 84a and the hollow cathode 84b in the laser galvatron 84 is maximum may be the wavelength for which the atoms of the material of the cathode 84b are resonantly ionized. The absolute wavelength of the laser beam as illustrated by A, B, C, D, and E in FIG. 2 may be obtained based on the difference from the wavelength for which the atoms of the material of the cathode 84b are resonantly ionized as illustrated by C in FIG. 2.

The optical system 85 shown in FIG. 1 may be provided to transmit the laser beam having been reflected from the first reflecting mirror 25, to the laser galvatron 84. The optical system 85 may include a second diffuser element 85a, a second condenser lens 85b, a pinhole 85c and a lens 85d.

The second diffuser element 85a may be provided to diffuse the laser beam having been reflected from the first reflecting mirror 25.

The second condenser lens 85b may be provided to focus the laser beam having been diffused by the second diffuser element 85a on the pinhole 85c.

The pinhole 85c may be provided at the focal position of the second condenser lens 85b.

The lens 85d may be provided to allow the laser beam having passed through the pinhole 85c to pass through the space in the hollow anode 84a and the space in the hollow cathode 84b in the laser galvatron 84.

The optogalvanic signal detecting circuit 86 may be provided to detect the current flowing between the hollow anode 84a and the hollow cathode 84b in the laser galvatron 84. The optogalvanic signal detecting circuit 86 may be provided to send the detected current value to the wavelength controller 61. The optogalvanic signal detecting circuit 86 may be connected to the hollow anode 84a and the hollow cathode 84b in the laser galvatron 84, and to the wavelength controller 61.

The galvatron power supply 87 may be provided to generate an electric discharge in the laser galvatron 84 by applying a voltage between the hollow anode 84a and the hollow cathode 84b in the laser galvatron 84, according to a command from the wavelength controller 61. The galvatron power supply 87 may be connected to the hollow anode 84a and the hollow cathode 84b in the laser galvatron 84, and to the wavelength controller 61.

The first damper 88 may be provided to absorb the laser beam having been reflected from the second reflecting mirror 82.

The second damper 89 may be provided to absorb the laser beam having passed through the laser galvatron 84.

The absolute wavelength detector 80 may include a gas cell to absorb the laser beam and an optical sensor, instead of the laser galvatron 84 and the second damper 89. When the line narrowing laser apparatus 100 is an ArF excimer laser apparatus, the gas cell to absorb the laser beam may be a Pt lamp. In this case, the wavelength of the laser beam is changed to obtain the minimal value of the detection signal of the optical sensor, so that the absolute wavelength of the laser beam may be detected.

The wavelength controller 61 may be connected to the optical sensor 40 included in the wavelength detection system 90, the laser controller 62, and the first driver 63. The wavelength controller 61 may be configured to calculate the difference between the reference wavelength and the absolute wavelength of the laser beam. The wavelength controller 61 may be configured to adjust the reference wavelength of the laser beam, based on the difference between the reference wavelength and the absolute wavelength of the laser beam, at an interval shorter than the interval for which the absolute wavelength of the laser beam is measured.

The laser controller 62 may be connected to the wavelength controller 61, the power supply 14 of the laser chamber 10, the shutter driver 32, and the exposure device controller 92 provided in the exposure device 91.

The first driver 63 may be provided to control the rotation of the one or more rotation stages 53 included in the line narrowing module 50, according to a command from the wavelength controller 61. The first driver 63 may be connected to the wavelength controller 61.

The line narrowing laser apparatus 100 illustrated in FIG. 1 includes the shutter driver 32, the wavelength controller 61, the laser controller 62, the first driver 63, and the second driver 83. Here, at least two of the shutter driver 32, the wavelength controller 61, the laser controller 62, the first driver 63 and the second driver 83 may be integrated with each other.

Figure 3:
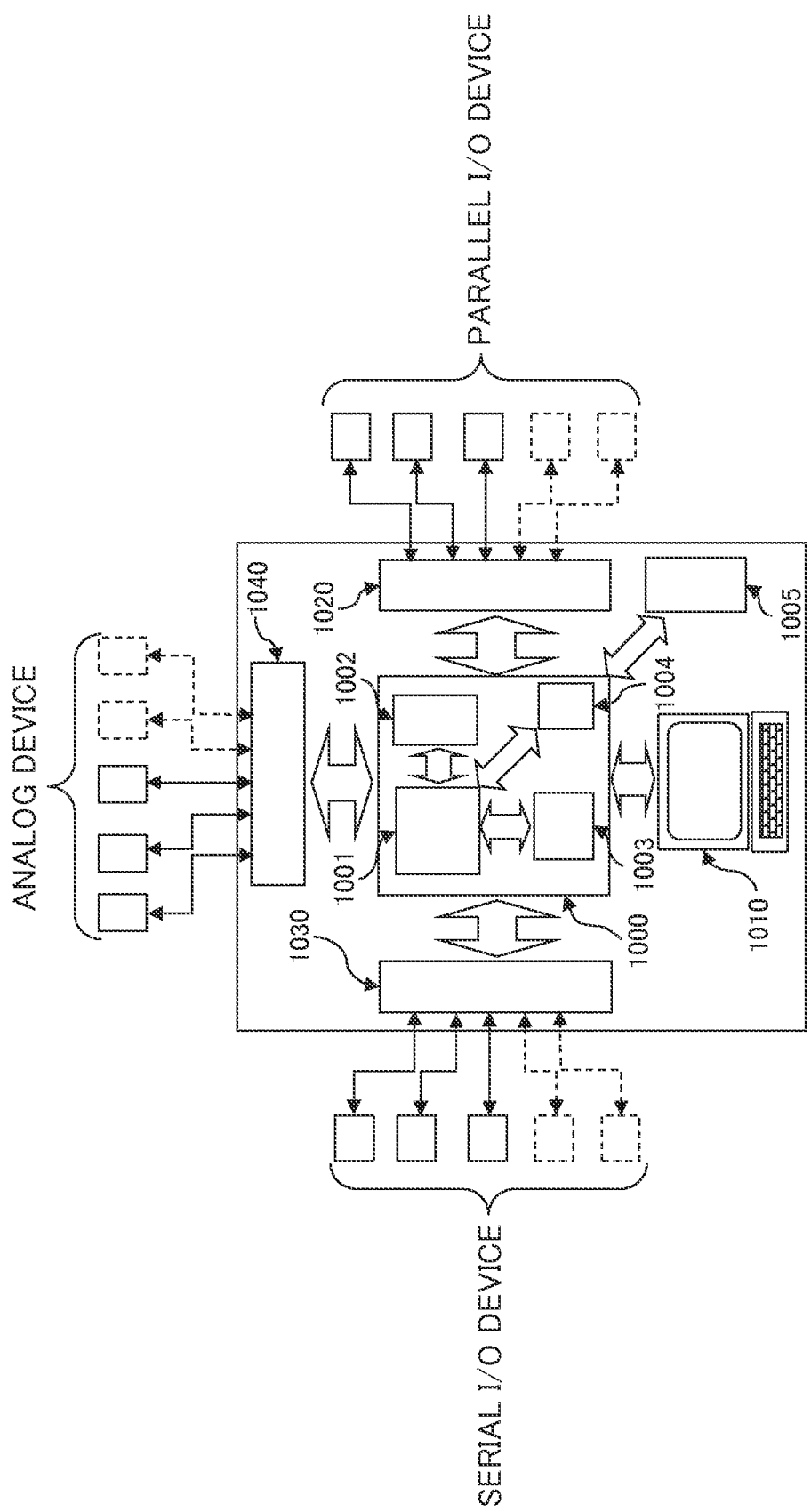
FIG. 3 is a drawing schematically illustrating the configuration of a controller of the exemplary laser apparatus.

FIG. 3 is a drawing schematically illustrating the configuration of a controller of the exemplary laser apparatus.

Each of the above-described controllers may be constituted by general-purpose control equipment such as a computer and a programmable controller. For example, each of the controllers may be constituted as follows.

The controller may be constituted of a processor 1000, and a storage memory 1005, a user interface 1010, a parallel I/O controller 1020, a serial I/O controller 1030, and an AD/DA converter 1040 which are connected to the processor 1000. The processor 1000 may be constituted of a CPU 1001, and a memory 1002, a timer 1003 and a GPU 1004 which are connected to the CPU 1001.

The processor 1000 may read out a program stored in the storage memory 1005. In addition, the processor 1000 may execute the read program, read out data from the storage memory 1005 according to the execution of the program, and store the data in the storage memory 1005.

The parallel I/O controller 1020 may be connected to a device that allows communication via a parallel I/O port. The parallel I/O controller 1020 may control the communication by digital signals via the parallel I/O port, which is executed by the processor 1000 in the course of the execution of the program.

The serial I/O controller 1030 may be connected to a device that allows communication via the serial I/O port. The serial I/O controller 1030 may control the communication by digital signals via the serial I/O port, which is executed by the processor in the course of the execution of the program.

The AD/DA converter 1040 may be connected to a device that allows communication via an analog port. The AD/DA converter 1040 may control the communication by analog signals via the analog port, which is executed by the processor 1000 in the course of the execution of the program.

By using the user interface 1010, the operator may allow the processor 1000 to display the execution process of the program and to halt or interrupt the execution of the program.

The CPU 1001 of the processor 1000 may perform arithmetic processing according to the program. The memory 1002 may temporarily store the program in the course of the execution of the program by the CPU 1001. Also, the memory 1002 may temporarily store the data in the course of the arithmetic processing. The timer 1003 may measure the time and the elapsed time, and output the time and the elapsed time to the CPU 1001 according to the execution of the program. When image data is inputted to the processor 1000, the GPU 1004 may process the image data according to the execution of the program, and output the result of the process to the CPU 1001.

The device connected to the parallel I/O controller 1020, which allows communication via the parallel I/O port, may be the optical sensor 40, the image sensor 74, and other controllers.

The device connected to the serial I/O controller 1030, which allows communication via the serial I/O port, may be other controllers.

The device connected to the AD/DA converter 1040, which allows communication via the analog port, may be the optical sensor 40, the image sensor 74, the optogalvanic signal detecting circuit 86, and so forth.

1.2 an Example of Operation of the Exemplary Laser Apparatus

The wavelength controller 61 may measure or calibrate the absolute wavelength of the laser beam at a predetermined cycle.

When measuring or calibrating the absolute wavelength of the laser beam, the wavelength controller 61 may inform the exposure device 91 of the measurement or calibration of the absolute wavelength of the laser beam by causing the laser controller 62 and the shutter driver 32 to close the laser exit shutter 31. When the wavelength controller 61 measures or calibrates the absolute wavelength of the laser beam, the laser beam may not be inputted to the exposure device 91.

When measuring or calibrating the absolute wavelength of the laser beam, the wavelength controller 61 may cause the laser controller 62 to oscillate the laser beam on a predetermined appropriate oscillating condition. The predetermined oscillating condition may be, for example, a repetition frequency of 100 Hz, and a power supply voltage of 15 kV.

The wavelength controller 61 may send a signal to turn the power supply of the laser galvatron 84 on, to the galvatron power supply 87, and therefore generate an electric discharge between the hollow anode 84a and the hollow cathode 84b in the laser galvatron 84.

The wavelength controller 61 may send a signal to the second driver 83 to allow the laser beam reflected from the first reflecting mirror 25 to enter the laser galvatron 84.

The wavelength controller 61 may send to the first driver 63 a signal to scan the wavelength of the laser beam at a predetermined gradient, within a predetermined wavelength range. The predetermined wavelength range may be, for example, from 193.430 nm or more to 193.440 nm or less. The predetermined gradient to scan the wavelength may be, for example, 0.0001 nm/sec.

The wavelength controller 61 may read the data of the interference pattern of the laser beam generated by the monitor etalon 72 included in the spectroscope 70, per pulse of the laser beam oscillating during the wavelength scanning. The wavelength controller 61 may calculate wavelength $\lambda$ (the detection wavelength of the spectroscope 70) of the laser beam based on the data of the interference pattern of the laser beam per pulse of the laser beam. The spectroscope 70 may measure relative wavelength drift $\delta\lambda=\lambda-\lambda c$ with respect to reference wavelength $\lambda c$ of the laser beam, and calculate $\Delta=\delta\lambda+\lambda c$, based on the reference wavelength $\lambda c$ of the laser beam and the relative wavelength drift $\delta\lambda$. When the spectroscope 70 is an etalon spectroscope, $\delta\lambda$ may be proportional to the square of the radius of the interference pattern of the laser beam that is generated by the monitor etalon 72.

The wavelength controller 61 may read the value detected by the optogalvanic signal detecting circuit 86 (intensity I of the optogalvanic signal) per pulse of the laser beam oscillating during the wavelength scanning.

The wavelength controller 61 may obtain detection wavelength $\lambda s$ of the spectroscope 70 at the peak of the intensity I of the optogalvanic signal, based on the relationship between the value of the detection wavelength $\lambda$ of the spectroscope 70 and the value of the intensity I of the optogalvanic signal. The absolute wavelength of the laser beam at the peak of the intensity I of the optogalvanic signal may be wavelength $\lambda abs$ for which the atoms of the material of the cathode 84b in the laser galvatron 84 are resonantly ionized. When the line narrowing laser apparatus 100 is an ArF excimer laser, the wavelength $\lambda abs$ for which the atoms of the material (Pt) of the cathode 84b of the laser galvatron 84 are resonantly ionized may be 193.4369 nm. Meanwhile, when the line narrowing laser apparatus 100 is a KrF excimer laser, the wavelength $\lambda abs$ for which the atoms of the material (Fe) of the cathode 84b of the laser galvatron 84 are resonantly ionized may be 248.327 nm.

The wavelength controller 61 may obtain difference $\Delta\lambda abs=\lambda abs-\lambda s$ between the detection wavelength $\lambda s$ of the spectroscope 70 at the peak of the intensity I of the optogalvanic signal and the wavelength $\lambda abs$ for which the atoms of the material of the cathode 84b of the laser galvatron 84 are resonantly ionized. The wavelength $\lambda abs$ for which the atoms of the material of the cathode 84b of the laser galvatron 84 are resonantly ionized may be the absolute wavelength of the laser beam at the peak of the intensity I of the optogalvanic signal.

When calibrating the absolute wavelength of the laser beam, the wavelength controller 61 may cause the first driver 63 to rotate at least one of the plurality of prisms 51 of the line narrowing module 50, so as to add $\Delta\lambda abs$ to the reference wavelength $\lambda c$ of the laser beam set for the spectroscope 70.

When controlling the wavelength of the laser beam, the wavelength controller 61 may cause the first driver 63 to rotate at least one of the plurality of prisms 51 of the line narrowing module 50, so as to add predetermined wavelength difference $\delta\lambda$ to the reference wavelength $\lambda c$ of the laser beam set for the spectroscope 70. The wavelength controller 61 may adjust the reference wavelength $\lambda c$ of the laser beam, based on the difference $\Delta\lambda abs$ between the reference wavelength $\lambda c$ and the absolute wavelength of the laser beam, at an interval shorter than the interval for which the absolute wavelength of the laser beam is measured.

After completion of the measurement or calibration of the absolute wavelength of the laser beam, the wavelength controller 61 may cause the second driver 83 to move the second reflecting mirror 82 to prevent the laser beam from entering the second diffuser element 85a. The wavelength controller 61 may stop sending the signal to scan the wavelength of the laser beam. The wavelength controller 61 may turn the galvatron power supply 87 off.

The wavelength controller 61 may cause the laser controller 62 to stop the laser oscillation.

The wavelength controller 61 may cause the laser controller 62 and the shutter driver 32 to inform the exposure device controller 92 of the completion of the measurement or calibration of the absolute wavelength of the laser beam and to open the laser exit shutter 31.

Figure 4:
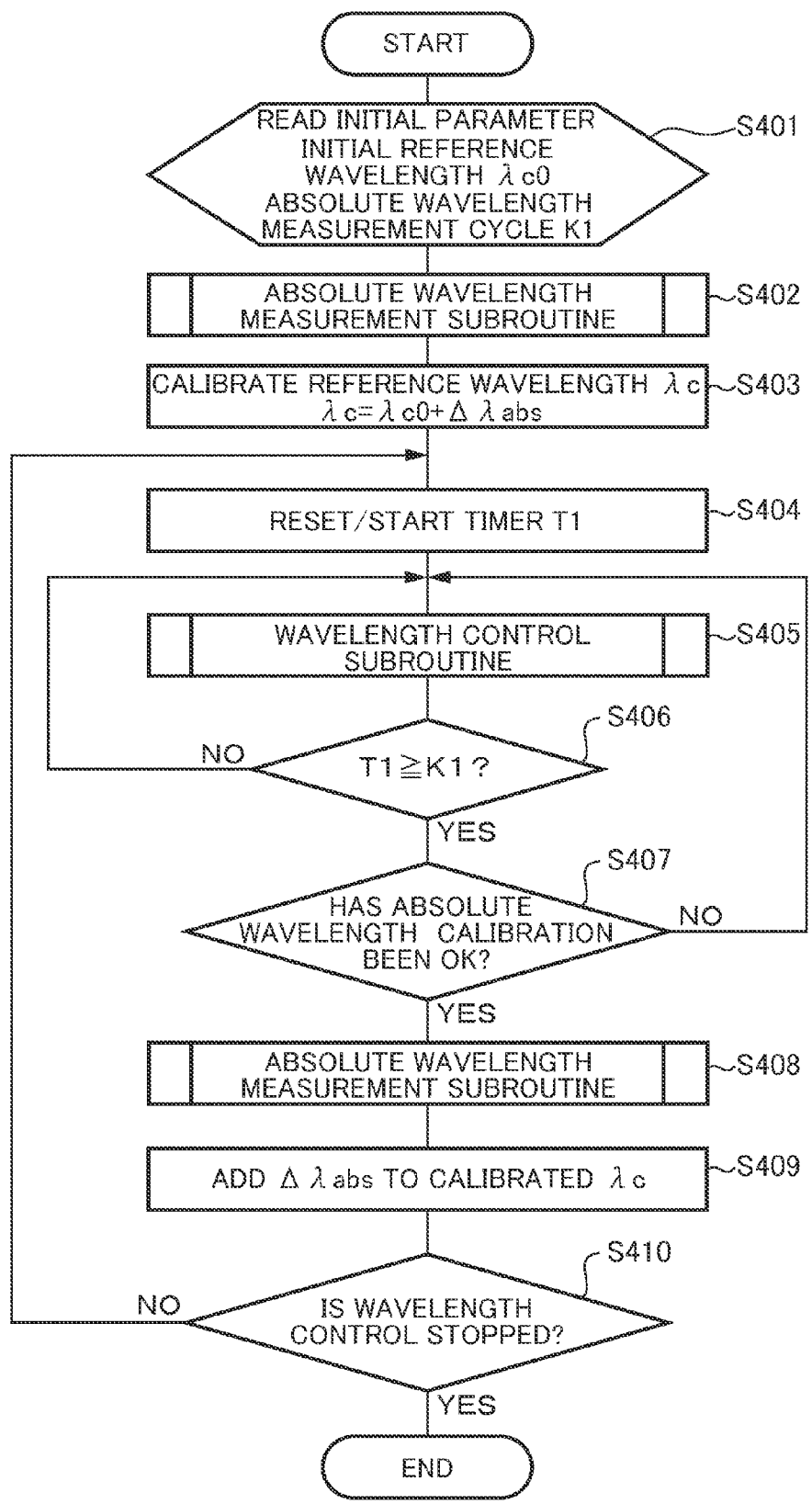
FIG. 4 is a flowchart illustrating a process performed by a wavelength controller according to related art.

2. An Exemplary Method of Controlling the Wavelength of a Laser Beam According to Related Art 2.1 Flowcharts According to Related Art FIG. 4 is a flowchart illustrating a process performed by the wavelength controller according to related art.

The wavelength controller 61 may start the process when the line narrowing laser apparatus 100 is set up, when the line narrowing laser apparatus 100 is stopped for a long time, just after the spectroscope 70 is replaced, or just after the absolute wavelength detector 80 is replaced.

In step S401, the wavelength controller 61 may read initial parameters regarding the process performed by the wavelength controller 61. The initial parameters may include initial reference wavelength $\lambda c0$ of the laser beam set for the spectroscope 70, and cycle K1 for which the absolute wavelength of the laser beam is measured (hereinafter "absolute wavelength measurement cycle K1"). The absolute wavelength measurement cycle K1 may be, for example, within a range from about one day or more to about ten days or less.

In step S402, the wavelength controller 61 may execute a subroutine for measuring the absolute wavelength of the laser beam (hereinafter "absolute wavelength measurement subroutine"). Contents of the absolute wavelength measurement subroutine will be described later. In the absolute wavelength measurement subroutine, the wavelength controller 61 may calculate the difference $\Delta\lambda abs$ between the initial reference wavelength $\lambda c0$ and the absolute wavelength of the laser beam.

In step S403, the wavelength controller 61 may calibrate the initial reference wavelength $\lambda c0$ of the laser beam by the difference $\Delta\lambda abs$ between the initial reference wavelength $\lambda c0$ and the absolute wavelength of the laser beam. The reference wavelength $\lambda c$ of the laser beam set for the spectroscope 70 may be calculated according to an equation $\lambda c=\lambda c0+\Delta\lambda abs$.

In step S404, the wavelength controller 61 may reset a timer that measures the period of time for which the absolute wavelength of the laser beam is controlled, and start measuring time T1 after the previous measurement of the absolute wavelength of the laser beam.

In step S405, the wavelength controller 61 may execute a subroutine for controlling the wavelength $\lambda$ of the laser beam (hereinafter "wavelength control subroutine"). Contents of the wavelength control subroutine will be described later. In the wavelength control subroutine, the wavelength controller 61 may add the predetermined wavelength difference $\delta\lambda$ to the reference wavelength $\lambda c$ of the laser beam ($\lambda c+\delta\lambda$) to control the wavelength $\lambda(=\lambda c+\delta\lambda)$ of the laser beam. The wavelength control subroutine may be executed during the exposure by the exposure device 91.

In step S406, the wavelength controller 61 may determine whether or not the time T1 after the previous measurement of the absolute wavelength of the laser beam is equal to or longer than the absolute wavelength measurement cycle K1. When T1 is shorter than K1 (T1<K1), the wavelength controller 61 may move the step back to the step S405 and repeat the wavelength control subroutine to continue to control the wavelength $\lambda$ of the laser beam. On the other hand, when T1 is equal to or longer than K1 (T1≥K1), the wavelength controller 61 may stop executing the wavelength control subroutine, and move the step to step S407.

In the step S407, the wavelength controller 61 may cause the exposure device controller 92 of the exposure device 91 to determine whether or not to allow to execute the absolute wavelength measurement subroutine. When receiving a signal from the exposure device 91, which indicates that the absolute wavelength measurement subroutine can be executed, the wavelength controller 61 may move the step to step S408. On the other hand, when receiving a signal from the exposure device 91, which indicates that the absolute wavelength measurement subroutine cannot be executed, the wavelength controller 61 may move the step back to the step S405.

In the step S408, the wavelength controller 61 may execute the absolute wavelength measurement subroutine. In the absolute wavelength measurement subroutine, the wavelength controller 61 may calculate the difference $\Delta\lambda abs$ between the reference wavelength $\lambda c$ and the absolute wavelength of the laser beam.

In step S409, the wavelength controller 61 may calibrate the reference wavelength $\lambda c$ of the laser beam by adding the difference $\Delta\lambda abs$ between the reference wavelength $\lambda c$ and the absolute wavelength of the laser beam, to the reference wavelength $\lambda c$ of the laser beam.

The timing at which the absolute wavelength of the laser beam is measured in the step S408 may match the timing at which the reference wavelength $\lambda c$ of the laser beam is calibrated in the step S409.

In step S410, the wavelength controller 61 may determine whether or not to stop controlling the wavelength of the laser beam. When stopping the control of the wavelength of the laser beam, the wavelength controller 61 may stop the operation for controlling the wavelength of the laser beam. On the other hand, when not stopping the control of the wavelength of the laser beam, the wavelength controller 61 may move the step back to the step S404, and continue to control the wavelength of the laser beam.

Figure 5:
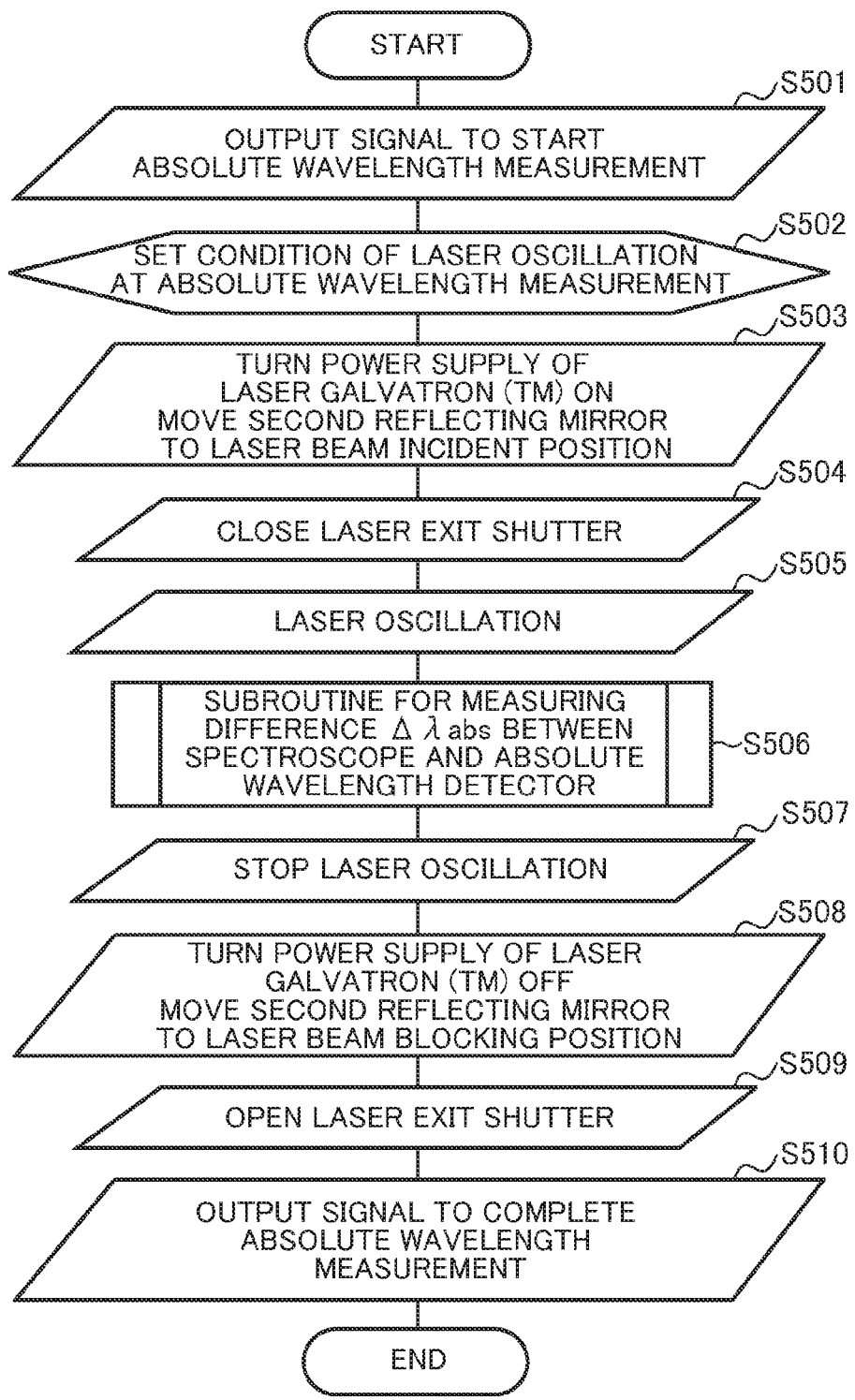
FIG. 5 is a flowchart illustrating a process of an absolute wavelength measurement subroutine included in the process executed by the wavelength controller according to related art.

FIG. 5 is a flowchart illustrating a process of the absolute wavelength measurement subroutine included in the process executed by the wavelength controller according to related art.

In step S501, the wavelength controller 61 may cause the laser controller 62 to output a signal to start measuring the absolute wavelength of the laser beam, to the exposure device controller 92.

In step S502, the wavelength controller 61 may set conditions of the laser oscillation when the absolute wavelength of the laser beam is measured. The conditions of the laser oscillation when the absolute wavelength of the laser beam is measured may include, for example, charging voltage HV (kV), repetition frequency f (Hz), wavelength change gradient v (pm/sec), a range of wavelength scanning $\lambda r$ (nm), and the number of measurements during the wavelength scanning. The charging voltage HV may be within a range from 13 kV or more to 20 kV or less. The repetition frequency f may be within a range from 100 Hz or more to 1000 Hz or less. The wavelength change gradient v may be within a range from 0.01 pm/sec or more to 0.1 pm/sec or less. The range of wavelength scanning $\lambda r$ may be within a range from 193.430 nm or more to 193.440 nm or less. The number of measurements during the wavelength scanning may be within a range from 100 or more to 1000 or less. The wavelength controller 61 may send data of the setting values for the charging voltage and the repetition frequency, to the laser controller 62.

In step S503, the wavelength controller 61 may turn the galvatron power supply 87 on. The wavelength controller 61 may cause the second driver 83 to move the second reflecting mirror 82 such that the laser beam reflected from the first reflecting mirror 25 enters the laser galvatron 84.

In step S504, the wavelength controller 61 may cause the laser controller 62 and the shutter driver 32 to close the laser exit shutter 31.

In step S505, the wavelength controller 61 may cause the laser controller 62 to perform laser oscillation at the charging voltage and the repetition frequency set in the step S502.

In step S506, the wavelength controller 61 may execute a subroutine for calculating the difference $\Delta\lambda abs$ between the reference wavelength $\lambda c$ and the absolute wavelength of the laser beam, that is, the wavelength difference $\Delta\lambda abs$ between the spectroscope 70 and the absolute wavelength detector 80 (hereinafter "wavelength difference measurement subroutine"). The wavelength difference measurement subroutine will be described later.

In step S507, the wavelength controller 61 may cause the laser controller 62 to stop the laser oscillation.

In step S508, the wavelength controller 61 may turn the galvatron power supply 87 off. The wavelength controller 61 may cause the second driver 83 to move the second reflecting mirror 82 to block the laser beam reflected from the first reflecting mirror 25, that is, to prevent the laser beam from entering the laser galvatron 84.

In step S509, the wavelength controller 61 may cause the laser controller 62 and the shutter driver 32 to close the laser exit shutter 31.

In step S510, the wavelength controller 61 may cause the laser controller 62 to output a signal indicating that the measurement of the absolute wavelength of the laser beam has been completed, to the exposure device controller 92.

Figure 6:
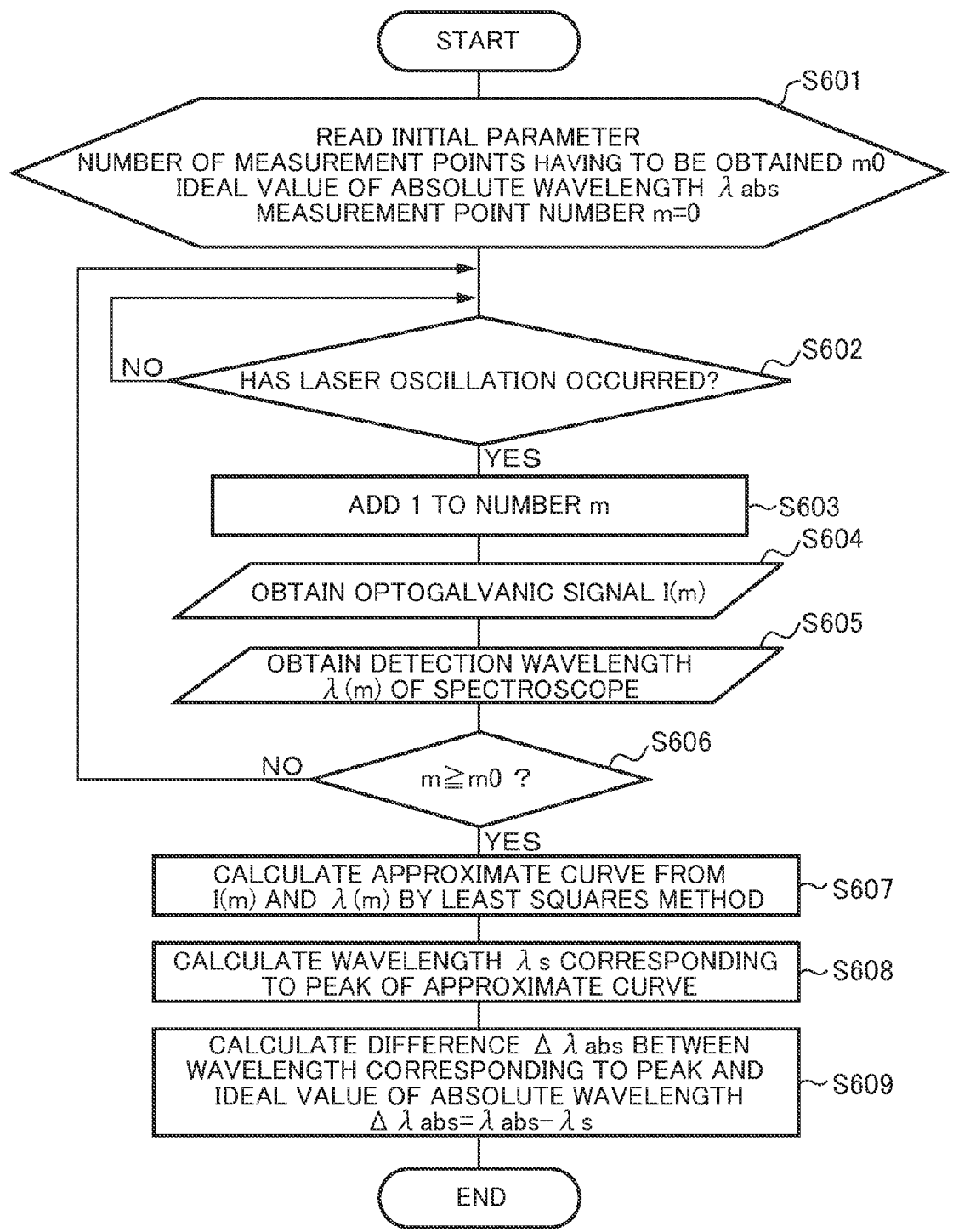
FIG. 6 is a flowchart illustrating a process of a wavelength difference measurement subroutine included in the process performed by the wavelength controller according to related art.

FIG. 6 is a flowchart illustrating a process of the wavelength difference measurement subroutine included in the process executed by the wavelength controller according to related art.

In step S601, the wavelength controller 61 may read initial parameters for the process of the wavelength difference measurement subroutine. The initial parameters may include the number m0 of measurement points having to be obtained for the detection wavelength $\lambda$ of the spectroscope 70 and the intensity I of the optogalvanic signal, and the ideal value $\lambda abs$ of the absolute wavelength of the laser beam.

The number m0 of measurement points having to be obtained may be, for example, within a range from 100 or more to 1000 or less. When the line narrowing laser apparatus 100 is an ArF excimer laser, the ideal value $\lambda abs$ of the absolute wavelength of the laser beam may be 193.4369 nm, which is the wavelength for which the atoms of Pt are resonantly ionized. Meanwhile, when the line narrowing laser apparatus 100 is a KrF excimer laser, the ideal value $\lambda abs$ of the absolute wavelength of the laser beam may be 248.327 nm, which is the wavelength for which the atoms of Fe are resonantly ionized. The number m of measurement points to be obtained for the detection wavelength $\lambda$ of the spectroscope 70 and the intensity I of the optogalvanic signal may be set to zero by the wavelength controller 61.

In step S602, the wavelength controller 61 may determine whether or not a signal from the optical sensor 40 has been detected. The signal from the optical sensor 40 may indicate that the laser oscillation has been performed. When determining that the signal from the optical sensor 40 has been detected, the wavelength controller 61 may move the step to step S603. On the other hand, when determining that any signal from the optical sensor 40 has not been detected, the wavelength controller 61 may repeat the step S602 until a signal from the optical sensor 40 is detected.

In the step S603, the wavelength controller 61 may add one to the number m of the measurement points. The wavelength controller 61 may add one to the number m of the measurement points every time obtaining a measurement point for the detection wavelength $\lambda$ of the spectroscope 70 and the intensity I of the optogalvanic signal.

In step S604, the wavelength controller 61 may cause the optogalvanic signal detecting circuit 86 to obtain the intensity I(m) of the optogalvanic signal.

In step S605, the wavelength controller 61 may cause the image sensor 74 to obtain the detection wavelength $\lambda$ (m) of the spectroscope 70.

In step S606, the wavelength controller 61 may determine whether or not the number m indicating the number of measurement points having been obtained is m0 or more that is the number of the measurement points having to be obtained. When the number m of the measurement points is m0 or more that is the number of the measurement points having to be obtained, the wavelength controller 61 may move the step to step S607. On the other hand, when the number m of the measurement points is less than m0, the wavelength controller 61 may move the step back to the step S602, and continue to obtain the measurement points for the detection wavelength $\lambda$ (m) of the spectroscope 70 and the intensity I(m) of the optogalvanic signal.

In the step S607, the wavelength controller 61 may obtain an approximate curve indicating the relationship between the detection wavelength λ (m) of the spectroscope 70 and the intensity I(m) of the optogalvanic signal, based on the obtained measurement points for the detection wavelength λ (m) of the spectroscope 70 and the intensity I(m) of the optogalvanic signal. In order to obtain the approximate curve, the wavelength controller 61 may apply the least squares method to the obtained measurement points for the detection wavelength λ (m) of the spectroscope 70 and the intensity I(m) of the optogalvanic signal.

Figure 7:
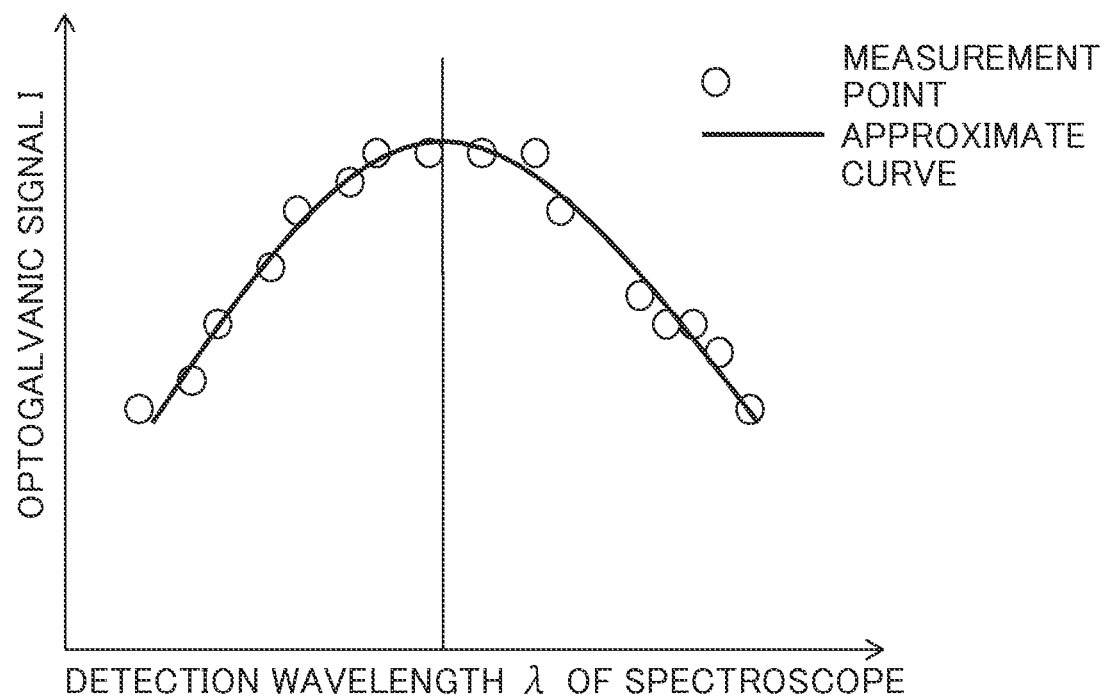
FIG. 7 is a drawing illustrating calculation of an approximate curve in the wavelength difference measurement subroutine.

FIG. 7 is a drawing illustrating calculation of an approximate curve in the wavelength difference measurement subroutine.

The graph shown in FIG. 7 has the horizontal axis representing the detection wavelength λ (m) of the spectroscope 70, and the vertical axis representing the intensity I (m) of the optogalvanic signal. The measurement points obtained for the detection wavelength λ (m) of the spectroscope 70 and the intensity I(m) of the optogalvanic signal may be plotted in the graph as illustrated in FIG. 7. By applying the least squares method to the measurement points plotted in the graph, the wavelength controller 61 may obtain the approximate curve indicating the relationship between the detection wavelength λ (m) of the spectroscope 70 and the intensity I (m) of the optogalvanic signal. The approximate curve may be a curve having the peak of the intensity I(m) of the optogalvanic signal with respect to the detection wavelength λ (m) of the spectroscope 70.

In step S608, the wavelength controller 61 may detect the peak of the approximate curve indicating the relationship between the detection wavelength λ (m) of the spectroscope 70 and the intensity I(m) of the optogalvanic signal, and calculate the detection wavelength λs of the spectroscope 70 corresponding to the peak of the approximate curve.

In step S609, the wavelength controller 61 may calculate the difference Δλabs between the detection wavelength λs of the spectroscope 70 corresponding to the peak of the approximate curve and the ideal value λabs of the absolute wavelength of the laser beam according to an equation Δλabs=λabs−λs.

Figure 8:
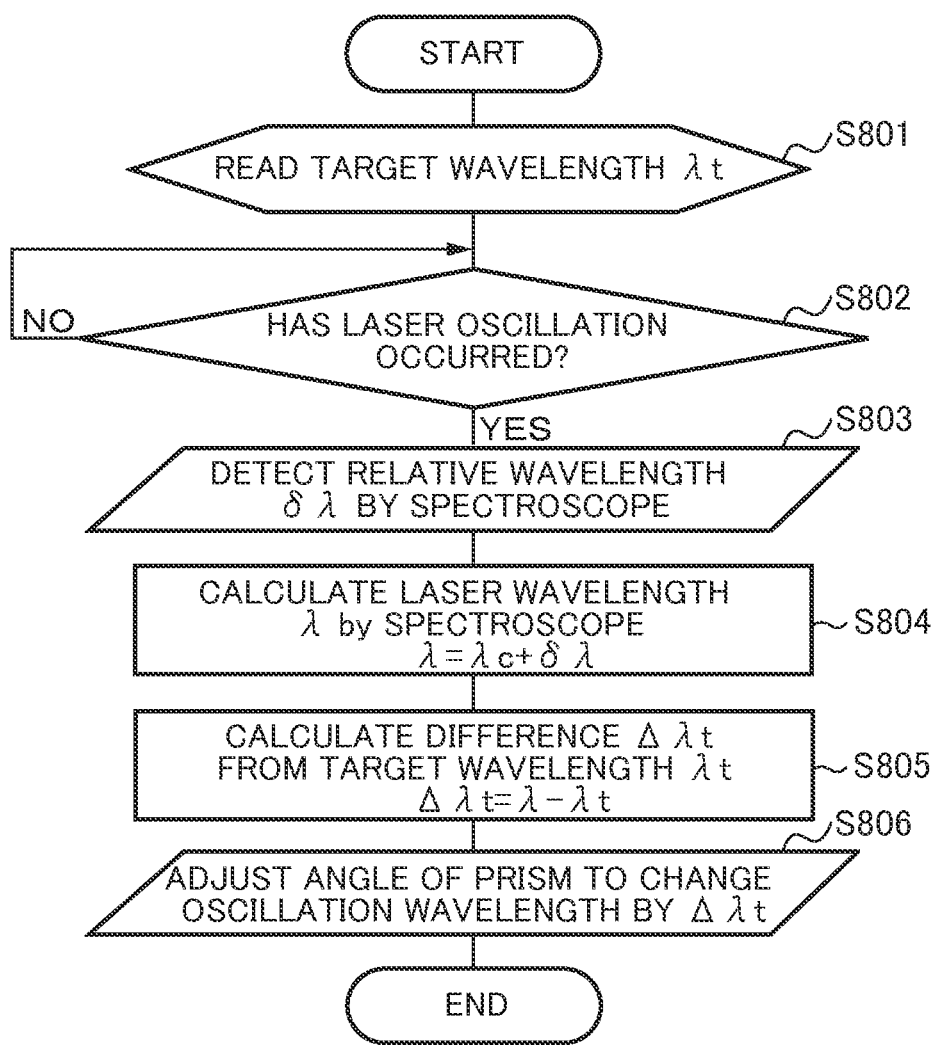
FIG. 8 is a flowchart illustrating a wavelength control subroutine in the process executed by the wavelength controller according to related art.

FIG. 8 is a flowchart illustrating the wavelength control subroutine in the process executed by the wavelength controller according to related art.

In step S801, the wavelength controller 61 may cause the laser controller 62 to read target wavelength λt sent from the exposure device controller 92.

In step S802, the wavelength controller 61 may determine whether or not a signal from the optical sensor 40 has been detected. The signal from the optical sensor 40 may represent that the laser beam has oscillated. When determining that the signal from the optical sensor 40 has been detected, the wavelength controller 61 may move the step to step S803. On the other hand, when determining that any signal from the optical sensor 40 has not been detected, the wavelength controller 61 may repeat the step S802 until a signal from the optical sensor 40 is detected.

In step S803, the wavelength controller 61 may cause the image sensor 74 to detect relative wavelength δλ with respect to the reference wavelength λc of the laser beam set for the spectroscope 70. When the spectroscope 70 is an etalon spectroscope, the relative wavelength δλ may be calculated according to an equation $\delta\lambda = \alpha \cdot r^2$, where r may represent the diameter of the interference pattern generated by the etalon spectroscope, and a may represent a proportional constant.

In step S804, the wavelength controller 61 may calculate wavelength λ of the laser beam based on the reference wavelength λc of the laser beam set for the spectroscope 70 and the relative wavelength δλ detected by the spectroscope 70, according to an equation λ=λc+δλ.

In step S805, the wavelength controller 61 may calculate the difference Δλt between the calculated wavelength λ of the laser beam and the target wavelength λt, according to an equation Δλt=λ−λt.

In step S806, the wavelength controller 61 may cause the first driver 63 to rotate at least one of the plurality of prisms 51 of the line narrowing module 50, so as to change the wavelength λ of the laser beam detected by the spectroscope 70 by the value of the calculated Δλt.

2.2 Problems with Related Art

Figure 9:
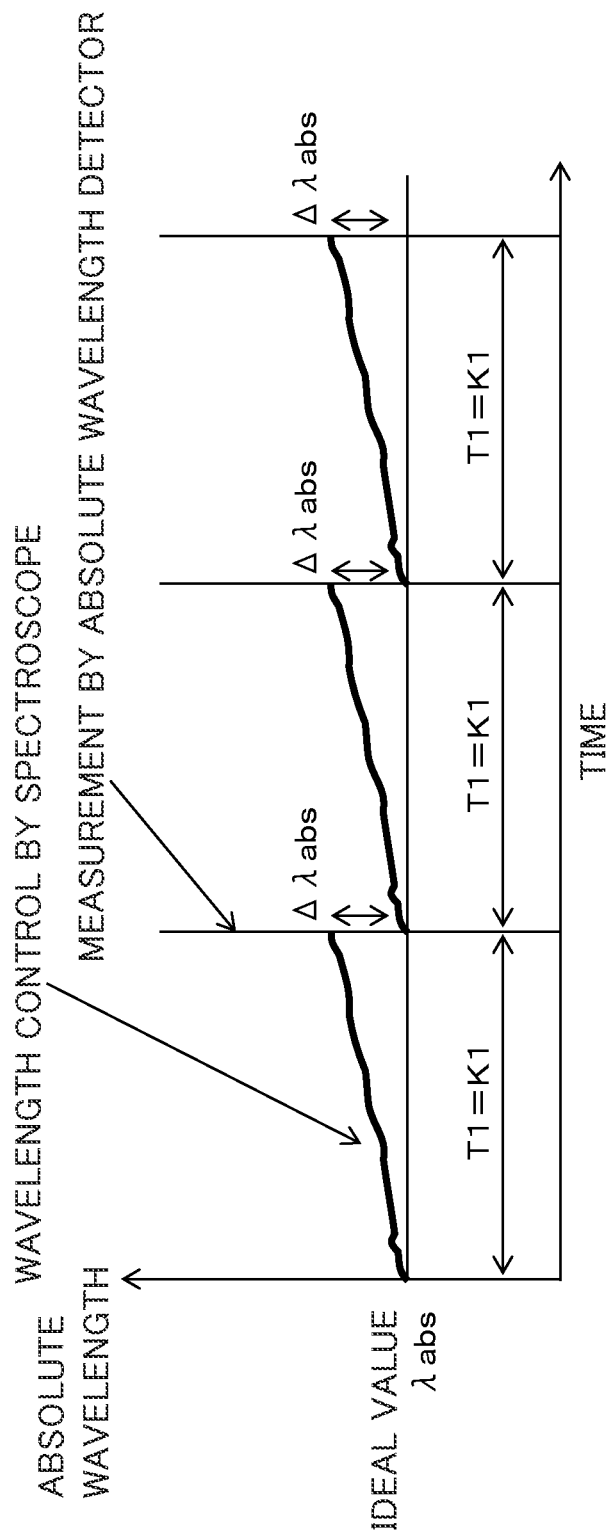
FIG. 9 is a drawing explaining a problem with calibration of the absolute wavelength of a laser beam according to related art.

FIG. 9 is a drawing illustrating problems with calibration of the absolute wavelength of the laser beam according to related art.

In the spectroscope 70 calculating the wavelength λ of the laser beam based on the reference wavelength λc and the detected relative wavelength δλ of the laser beam, adrift in the reference wavelength λc may occur during a predetermined period of time. The drift in the reference wavelength λc of the laser beam may be about 100 fm for ten days. The drift in the reference wavelength λc of the laser beam may occur due to a change in the pressure or temperature in the spectroscope 70, and fluctuations in the property of the etalon over time. For example, as illustrated in FIG. 9, even if the reference wavelength λc of the laser beam is initially calibrated to the ideal wavelength λabs of the laser beam, the wavelength λ of the laser beam may fluctuate over time due to the drift in the reference wavelength λc of the laser beam.

As illustrated in FIG. 9, after controlling the wavelength of the laser beam by means of the spectroscope 70 until the time T1 after the previous measurement of the absolute wavelength of the laser beam reaches the absolute wavelength measurement cycle K1, the wavelength controller 61 may measure the absolute wavelength of the laser beam and calibrate the reference wavelength λc of the laser beam. Alternately, the wavelength controller 61 may calibrate the reference wavelength λc of the laser beam by adding the difference Δλabs between the reference wavelength λc and the absolute wavelength of the laser beam to the reference wavelength λc of the laser beam.

When the difference Δλabs between the reference wavelength λc and the absolute wavelength of the laser beam is added to the reference wavelength λc of the laser beam, the wavelength λ of the laser beam is changed by Δλabs. When the change Δλabs in the wavelength λ of the laser beam is not so small for the exposure device 91, it may affect the adjustment of the wavelength λ of the laser beam used in the exposure device 91.

3. Embodiments of the Method of Controlling the Wavelength of a Laser Beam 3.1 Embodiment 1

Figure 10:
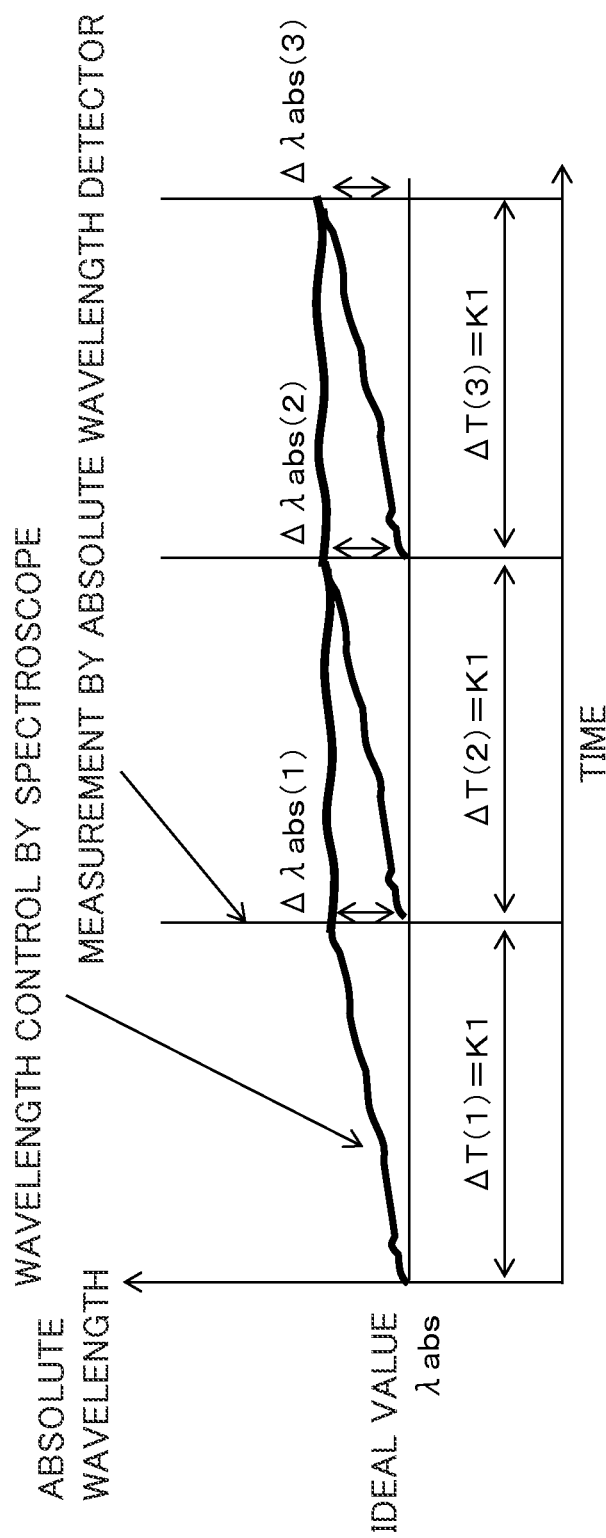
FIG. 10 is a drawing illustrating a method of controlling the wavelength of a laser beam according to Embodiment 1.

FIG. 10 is a drawing illustrating the method of controlling the wavelength of a laser beam according to Embodiment 1.

As illustrated in FIG. 10, the time interval until the first measurement, the interval between the first and second measurements, . . . the interval between the previous and n-th measurements of the absolute wavelength of the laser beam may be calculated as ΔT(1), ΔT(2), . . . , ΔT (n), respectively. The reference wavelength λc of the laser beam set for the spectroscope 70 may be initially calibrated to the ideal value λabs of the wavelength of the laser beam, and the differences between the reference wavelength λc and the absolute wavelength of the laser beam at the first, second, . . . , n-th measurements may be calculated as $\Delta\lambda abs(1)$, $\Delta\lambda abs(2)$, . . . , $\Delta\lambda abs(n)$, respectively.

The reference wavelength $\lambda c$ of the laser beam may be adjusted based on the difference $\Delta\lambda abs(n)$ between the reference wavelength $\lambda c$ and the absolute wavelength of the laser beam, at a time interval shorter than time interval $\Delta T(n)$ for which the absolute wavelength of the laser beam is measured. The reference wavelength $\lambda c$ of the laser beam may be adjusted after the absolute wavelength of the laser beam is first measured since the start of the measurement of the time interval for which the absolute wavelength of the laser beam is measured, that is, may be adjusted for $\Delta T(2)$, . . . , $\Delta T(n)$.

The reference wavelength $\lambda c$ of the laser beam may be adjusted with a gradient for the time interval, which is substantially the same as the drift gradient of the reference wavelength $\lambda c$ of the laser beam for the time interval for which the absolute wavelength of the laser beam is measured. The gradient for the time interval to adjust the reference wavelength $\lambda c$ of the laser beam may be referred to as a control gradient.

The reference wavelength $\lambda c$ of the laser beam may be adjusted with the control gradient smaller than the drift gradient of the reference wavelength $\lambda c$ of the laser beam.

The amount of the variation in the drift of the reference wavelength $\lambda c$ of the laser beam may be substantially the same as the difference ($\Delta\lambda abs(1)$, $\Delta\lambda abs(2)$, . . . , $\Delta\lambda abs(n)$) between the reference wavelength $\lambda c$ and the absolute wavelength of the laser beam.

Since the reference wavelength $\lambda c$ of the laser beam is adjusted with the control gradient equal to or smaller than the drift gradient of the reference wavelength $\lambda c$ of the laser beam, it may be possible to reduce the variation in $\Delta\lambda abs(n)$ of the reference wavelength $\lambda c$ of the laser beam. Since the variation in $\Delta\lambda abs(n)$ of the reference wavelength $\lambda c$ of the laser beam is reduced, it may be possible to reduce the variation in $\Delta\lambda abs(n)$ of the wavelength $\lambda$ of the laser beam. Accordingly, it may be possible to reduce the effect on the adjustment of the wavelength $\lambda$ of the laser beam used in the exposure device 91.

Figure 11:
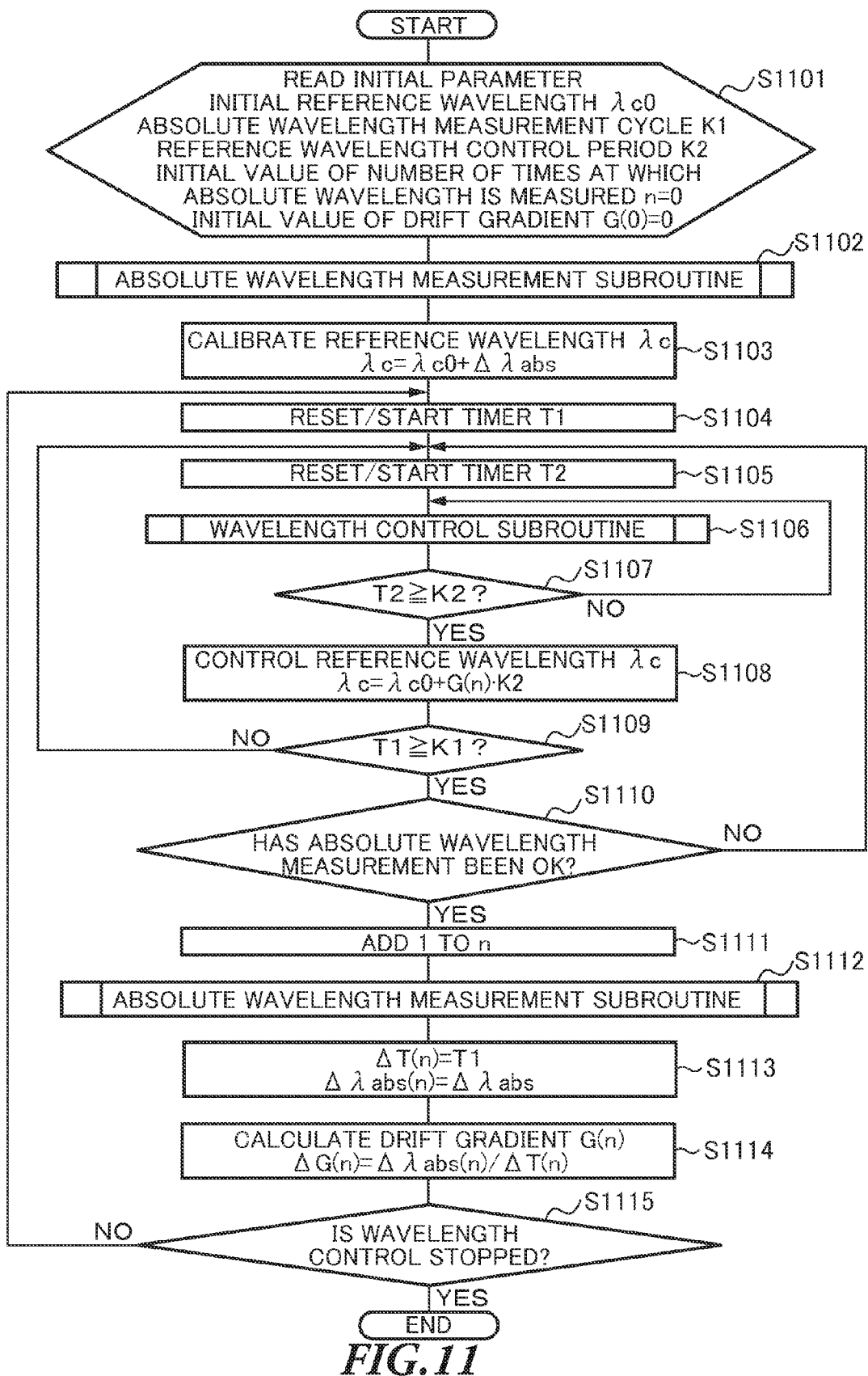
FIG. 11 is a flowchart illustrating the method of controlling the wavelength of a laser beam according to Embodiment 1.

FIG. 11 is a flowchart illustrating the method of controlling the wavelength of a laser beam according to Embodiment 1.

In step S1101, the wavelength controller 61 may read initial parameters regarding a process performed by the wavelength controller 61. Similarly to the step S401 in FIG. 4, the initial parameters may include the initial reference wavelength $\lambda c0$ of the laser beam set for the spectroscope 70, and the absolute wavelength measurement cycle K1. The initial parameters may additionally include a period K2 for which the reference wavelength is controlled ("hereinafter a reference wavelength control period K2), an initial value n of the number of times at which the absolute wavelength is measured, and an initial value of the drift gradient G(0). The reference wavelength control period K2 may be within a range from the absolute wavelength measurement cycle K1/1000 or more to the absolute wavelength measurement cycle K1/100 or less. The initial value n of the number of times at which the absolute wavelength is measured may be set to zero. The initial value of the drift gradient G(0) may be set to zero.

Step S1102 may be the same as the step S402 of FIG. 4.
Step S1103 may be the same as the step S403 of FIG. 4.
Step S1104 may be the same as the step S404 of FIG. 4.
In step S1105, the wavelength controller 61 may reset a timer that measures the period of time for which the reference wavelength $\lambda c$ of the laser beam set for the spectroscope 70 is controlled, and start measuring time T2 after the previous control of the reference wavelength $\lambda c$ of the laser beam.

Step S1106 may be the same as the step S405 of FIG. 4.
In step S1107, the wavelength controller 61 may determine whether or not the time T2 after the previous control of the reference wavelength $\lambda c$ of the laser beam is equal to or longer than the reference wavelength control period K2. The reference wavelength control period K2 may be, for example, within a range from about one day or more to about ten days or less. When T2 is shorter than K2 (T2<K2), the wavelength controller 61 may move the step back to the step S1106, and repeat the wavelength control subroutine to continue to control the wavelength $\lambda$ of the laser beam. On the other hand, when T2 is equal to or longer than K2 (T2≥K2), the wavelength controller 61 may stop executing the wavelength control subroutine, and move the step to step S1108.

In the step S1108, the wavelength controller 61 may control the reference wavelength $\lambda c$ of the laser beam. The wavelength controller 61 may add a value obtained by multiplying the drift gradient G(n) by the reference wavelength control period K2, to the reference wavelength $\lambda c$ of the laser beam.

Step S1109 may be the same as the step S406 of FIG. 4.
Step S1110 may be the same as the step S407 of FIG. 4.
In step S1111, the wavelength controller 61 may add one to the number of times n at which the absolute wavelength is measured.

Step S1112 may be the same as the step S408 of FIG. 4. The wavelength controller 61 may calculate the difference $\Delta\lambda abs$ between the reference wavelength $\lambda c$ and the absolute wavelength of the laser beam.

In step S1113, the wavelength controller 61 may substitute the value of T1 for the time interval $\Delta T(n)$ for which the absolute wavelength of the laser beam is measured, and also substitute $\Delta\lambda abs$ for the difference $\Delta\lambda abs(n)$ between the reference wavelength $\lambda c$ and the absolute wavelength of the laser beam. $\Delta T(n)$ may be substantially constant with respect to n. $\Delta\lambda abs(n)$ may be substantially constant with respect to n.

In step S1114, the wavelength controller 61 may calculate the drift gradient G(n). The drift gradient G(n) may be defined by the time interval $\Delta T(n)$ for which the absolute wavelength of the laser beam is measured, and the difference $\Delta\lambda abs(n)$ between the reference wavelength $\lambda c$ and the absolute wavelength of the laser beam. The drift gradient G(n) may be defined by an expression $\Delta\lambda abs(n)/\Delta T(n)$. G(n) may be substantially constant with respect to n.

Step S1115 may be the same as the step S410 of FIG. 4.

According to Embodiment 1, since the step S1108 and so forth are provided instead of the step S409 of FIG. 4, it may be possible to reduce the variation in the reference wavelength $\lambda c$ of the laser beam. $\Delta\lambda abs$ is not added to the reference wavelength $\lambda c$ of the laser beam, but a value being approximately the same as $\Delta\lambda abs \times (K2/K1)$ is added to the reference wavelength $\lambda c$ of the laser beam. By this means, it may be possible to reduce the variation in the reference wavelength $\lambda c$ of the laser beam from $\Delta\lambda abs$ to $\Delta\lambda abs \times (K2/K1)$.

3.2 Embodiment 2

Figure 12:
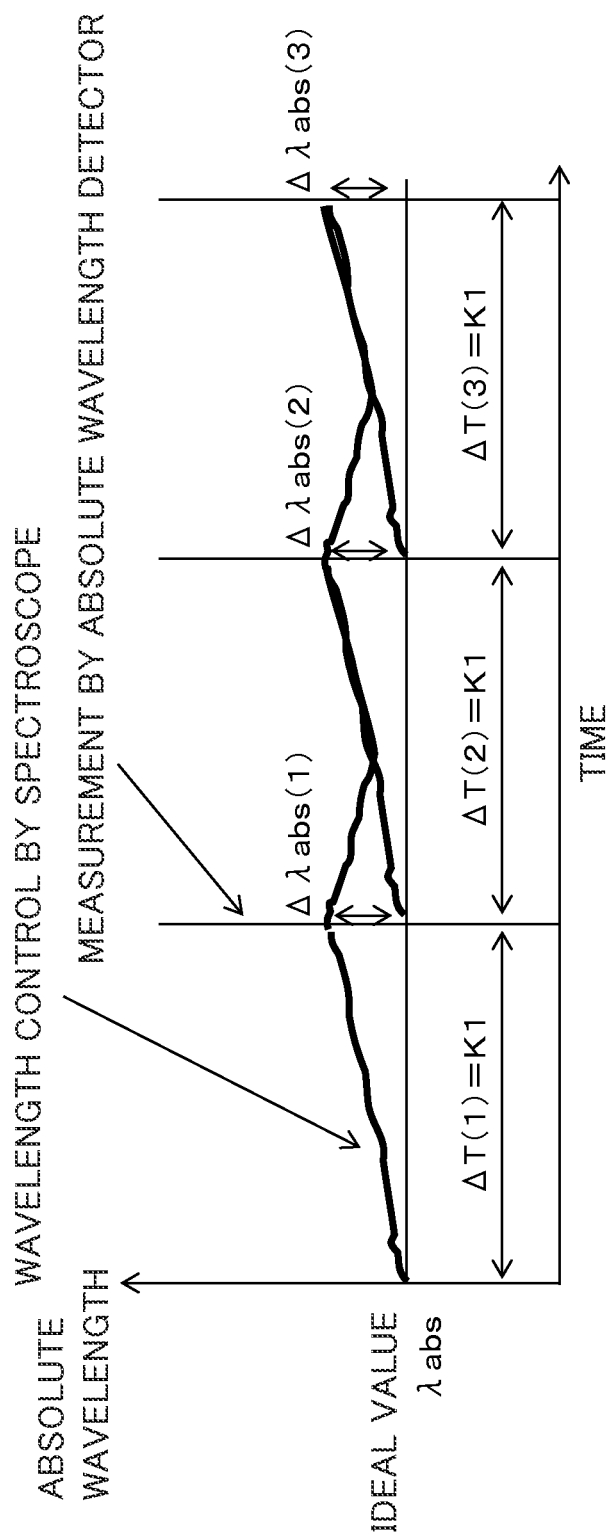
FIG. 12 is a drawing illustrating the method of controlling the wavelength of a laser beam according to Embodiment 2.

FIG. 12 is a drawing illustrating the method of controlling the wavelength of a laser beam according to Embodiment 2.

As illustrated in FIG. 12, the time interval until the first measurement, the interval between the first and second measurements, the interval between the previous and n-th measurements of the absolute wavelength of the laser beam may be calculated as $\Delta T(1), \Delta T(2), \ldots, \Delta T(n)$, respectively. The reference wavelength $\lambda c$ of the laser beam set for the spectroscope 70 may be initially calibrated to the ideal value $\lambda abs$ of the wavelength of the laser beam, and the differences between the reference wavelength $\lambda c$ and the absolute wavelength of the laser beam at the first, second, . . . , n-th measurements may be calculated as $\Delta\lambda abs(1), \Delta\lambda abs(2), \ldots, \Delta\lambda abs(n)$, respectively.

The reference wavelength $\lambda c$ of the laser beam may be adjusted based on the difference $\Delta\lambda abs(n)$ between the reference wavelength $\lambda c$ and the absolute wavelength of the laser beam, at a time interval shorter than the time interval $\Delta T(n)$ for which the absolute wavelength of the laser beam is measured. The reference wavelength $\lambda c$ of the laser beam may be adjusted after the absolute wavelength of the laser beam is first measured since the start of the measurement of the time interval for which the absolute wavelength of the laser beam is measured, that is, may be adjusted for $\Delta T(2), \ldots, \Delta T(n)$.

The reference wavelength $\lambda c$ of the laser beam may be adjusted with the control gradient greater than the drift gradient of the reference wavelength $\lambda c$ of the laser beam for the time interval for which the absolute wavelength of the laser beam is measured. The reference wavelength $\lambda c$ of the laser beam may be adjusted with the control gradient that is an integral multiple of the drift gradient of the reference wavelength $\lambda c$ of the laser beam.

The amount of the variation in the drift of the reference wavelength $\lambda c$ of the laser beam may be substantially the same as the difference ($\Delta\lambda abs(1), \Delta\lambda abs(2), \ldots, \Delta\lambda abs(n)$) between the reference wavelength $\lambda c$ and the absolute wavelength of the laser beam.

The reference wavelength $\lambda c$ of the laser beam may be adjusted with the control gradient smaller than the drift gradient of the reference wavelength $\lambda c$ of the laser beam that affects the adjustment of the wavelength of the laser beam in the exposure device 91.

The reference wavelength $\lambda c$ of the laser beam is adjusted with the control gradient that is greater than the drift gradient of the reference wavelength $\lambda c$ of the laser beam but does not affect the adjustment of the wavelength of the laser beam in the exposure device 91. Therefore, it may be possible to reduce the variation in $\Delta\lambda abs(n)$ of the reference wavelength $\lambda c$ of the laser beam. Since the variation in $\Delta\lambda abs(n)$ of the reference wavelength $\lambda c$ of the laser beam is reduced, it may be possible to reduce the variation in $\Delta\lambda abs(n)$ of the wavelength $\lambda$ of the laser beam. Accordingly, it may be possible to reduce the effect on the adjustment of the wavelength $\lambda$ of the laser beam used in the exposure device 91.

The reference wavelength $\lambda c$ of the laser beam may be adjusted at a time interval shorter than the time interval $\Delta T(n)$ for which the absolute wavelength of the laser beam is measured, depending on the control gradient. When the reference wavelength $\lambda c$ of the laser beam is adjusted with the control gradient that is an integral multiple of the drift gradient of the reference wavelength $\lambda c$ of the laser beam, the adjustment may be performed at a time interval obtained by dividing the time interval $\Delta T(n)$ for which the absolute wavelength of the laser beam is measured by the integral multiple.

Figure 13:
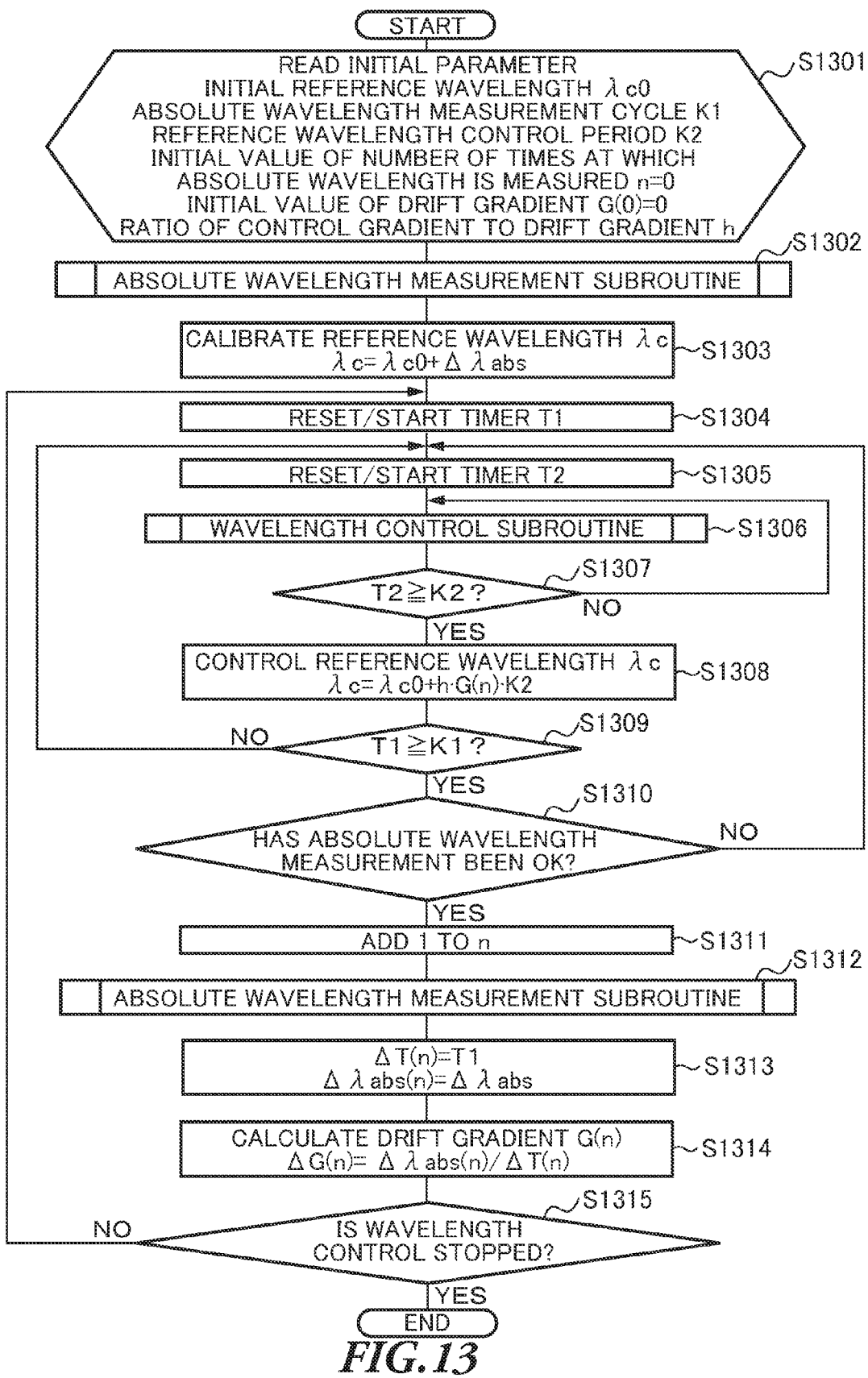
FIG. 13 is a flowchart illustrating the method of controlling the wavelength of a laser beam according to Embodiment 2.

FIG. 13 is a flowchart illustrating the method of controlling the wavelength of a laser beam according to Embodiment 2.

In step S1301, the wavelength controller 61 may read initial parameters regarding a process performed by the wavelength controller 61. The initial parameters may include the same initial parameters as in the step S1101 of FIG. 11. The initial parameters may additionally include a ratio h of the control gradient to the drift gradient. The ratio h of the control gradient to the drift gradient may be a value within a range from 1 or more to 5 or less. When the ratio h of the control gradient to the drift gradient is 1, Embodiment 2 may be the same as Embodiment 1. The ratio h of the control gradient to the drift gradient may be an integer. The ratio h of the control gradient to the drift gradient may be a value that does not affect the adjustment of the wavelength of the laser beam in the exposure device 91.

Step S1302 may be the same as the step S1102 of FIG. 11.
Step S1303 may be the same as the step S1103 of FIG. 11.
Step S1304 may be the same as the step S1104 of FIG. 11.
Step S1305 may be the same as the step S1105 of FIG. 11.
Step S1306 may be the same as the step S1106 of FIG. 11.
Step S1307 may be the same as the step S1107 of FIG. 11.

In step S1308, the wavelength controller 61 may control the reference wavelength $\lambda c$ of the laser beam set for the spectroscope 70. The wavelength controller 61 may add a value obtained by multiplying the drift gradient G(n) by the ratio h of the control gradient to the drift gradient and the reference wavelength control period K2, to the reference wavelength $\lambda c$ of the laser beam.

In step S1309, the wavelength controller 61 may determine whether or not the time T1 after the previous measurement of the absolute wavelength of the laser beam is equal to or greater than a period obtained by dividing the absolute wavelength measurement cycle K1 by the ratio h of the control gradient to the drift gradient. When T1 is shorter than K1/h (T1<K1/h), the wavelength controller 61 may move the step back to the step S1305, and repeat the wavelength control subroutine to continue to control the wavelength $\lambda$ of the laser beam. On the other hand, when T1 is equal to or longer than K1/h (T1≥K1/h), the wavelength controller 61 may stop executing the wavelength control subroutine, and move the step to step S1311.

Step S1310 may be the same as the step S1110 of FIG. 11.
Step S1311 may be the same as the step S1111 of FIG. 11.
Step S1312 may be the same as the step S1112 of FIG. 11.
Step S1313 may be the same as the step S1113 of FIG. 11.
Step S1314 may be the same as the step S1114 of FIG. 11.
Step S1315 may be the same as the step S1115 of FIG. 11.

According to Embodiment 2, the step 1308 and the step S1309 are provided instead of the step S1108 and the step 1109 of FIG. 11. Therefore, it may be possible to reduce the variation in the reference wavelength $\lambda c$ of the laser beam. $\Delta\lambda abs$ is not added to the reference wavelength $\lambda c$ of the laser beam, but a value being approximately the same as $\Delta\lambda abs \times (K2/K1) \times h$ is added to the reference wavelength $\lambda c$ of the laser beam. By this means, it may be possible to reduce the variation in the reference wavelength $\lambda c$ of the laser beam from $\Delta\lambda abs$ to $\Delta\lambda abs \times (K2/K1) \times h$. The value being approximately the same as $\Delta\lambda abs \times (K2/K1) \times h$ is added to the reference wavelength $\lambda c$ of the laser beam at the time interval K1/h, and therefore it may be possible to prevent the reference wavelength $\lambda c$ of the laser beam from being excessively adjusted.

3.3 Embodiment 3

Figure 14:
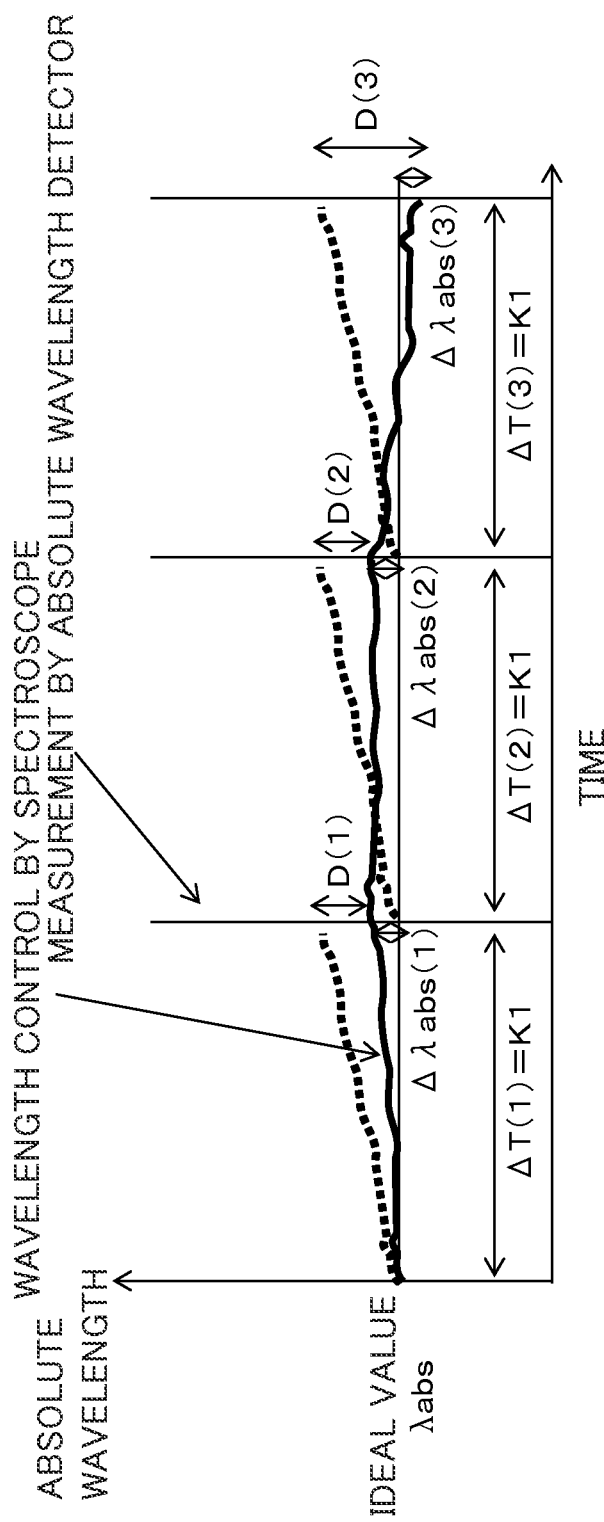
FIG. 14 is a drawing illustrating the method of controlling the wavelength of a laser beam according to Embodiment 3.

FIG. 14 is a drawing illustrating the method of controlling the wavelength of a laser beam according to Embodiment 3.

As illustrated in FIG. 14, the time interval until the first measurement, the interval between the first and second measurements, the interval between the previous and n-th measurements of the absolute wavelength of the laser beam may be calculated as $\Delta T(1), \Delta T(2), \ldots, \Delta T(n)$, respectively. The reference wavelength $\lambda c$ of the laser beam set for the spectroscope 70 may be initially calibrated to the ideal value λabs of the wavelength of the laser beam, and the differences between the reference wavelength λc and the absolute wavelength of the laser beam at the first, second, . . . , n-th measurements may be calculated as Δλabs(1), Δλabs (2), . . . , Δλabs(n), respectively.

The reference wavelength λc of the laser beam may be adjusted based on the difference Δλabs(n) between the reference wavelength λc and the absolute wavelength of the laser beam and the initial value of the drift gradient of the reference wavelength λc of the laser beam, at the time interval ΔT(n) shorter than the time interval for which the absolute wavelength of the laser beam is measured. The value of the drift gradient of the reference wavelength λc of the laser beam may correspond to the gradient of the net drift of the reference wavelength λc of the laser beam for the time interval ΔT(n) for which the absolute wavelength of the laser beam is measured.

The reference wavelength λc of the laser beam may be adjusted with the initial value of the drift gradient (a predetermined gradient) of the reference wavelength λc of the laser beam, for the time interval ΔT(1) for which the absolute wavelength of the laser beam is measured until the absolute wavelength of the laser beam is first measured since the start of the measurement of the time interval ΔT(n) for which the absolute wavelength of the laser beam is measured.

After the absolute wavelength of the laser beam is first measured since the start of the measurement of the time interval ΔT(n) for which the absolute wavelength of the laser beam is measured, the difference Δλabs(n) between the reference wavelength λc and the absolute wavelength of the laser beam may be corrected based on the initial value of the drift gradient of the reference wavelength λc of the laser beam. The correction values of the differences Δλabs(1), Δλabs(2), . . . , Δλabs(n) between the reference wavelength λc and the absolute wavelength of the laser beam at the first, second, . . . , n-th measurements, may be calculated as D(1), D(2), . . . , D(n), respectively. The correction values of the differences Δλabs(1), Δλabs(2), Δλabs(n) between the reference wavelength λc and the absolute wavelength of the laser beam at the first, second, . . . , n-th measurements, may depend on the initial value of the drift gradient of the reference wavelength λc of the laser beam.

The values G(1), G(2), . . . , G(n) of the drift gradient of the reference wavelength λc of the laser beam at the first, second . . . , n-th measurements may be calculated as (Δλabs(1)+D(1))/ΔT(1), (Δλabs(2)+D(2))/ΔT(2), . . . , (Δλabs(n)+D(n))/ΔT(n), respectively.

After the absolute wavelength of the laser beam is first measured since the start of the measurement of the time interval ΔT(n) for which the absolute wavelength of the laser beam is measured, the reference wavelength λc of the laser beam may be adjusted based on the values G(1), G(2), . . . , G(n) of the drift gradient of the reference wavelength λc of the laser beam.

According to Embodiment 3 compared to Embodiment 1 or Embodiment 2, the reference wavelength λc of the laser beam may be adjusted as well until the absolute wavelength of the laser beam is first measured since the start of the measurement of the time interval ΔT(n) for which the absolute wavelength of the laser beam is measured.

According to Embodiment 3, compared to Embodiment 1 or Embodiment 2, it may be possible to reduce the differences Δλabs(1), Δλabs(2), . . . , Δλabs(n) between the reference wavelength λc and the absolute wavelength of the laser beam at the first, second, . . . , n-th measurements, respectively.

According to Embodiment 3, compared to Embodiment 1 or Embodiment 2, it may be possible to reduce the variation in Δλabs(n) of the reference wavelength λc of the laser beam. Since the variation in Δλabs(n) of the reference wavelength λc of the laser beam is reduced, it may be possible to reduce the variation in Δλabs(n) of the wavelength λ of the laser beam. Accordingly, it may be possible to reduce the effect on the adjustment of the wavelength λ of the laser beam used in the exposure device 91.

Figure 15:
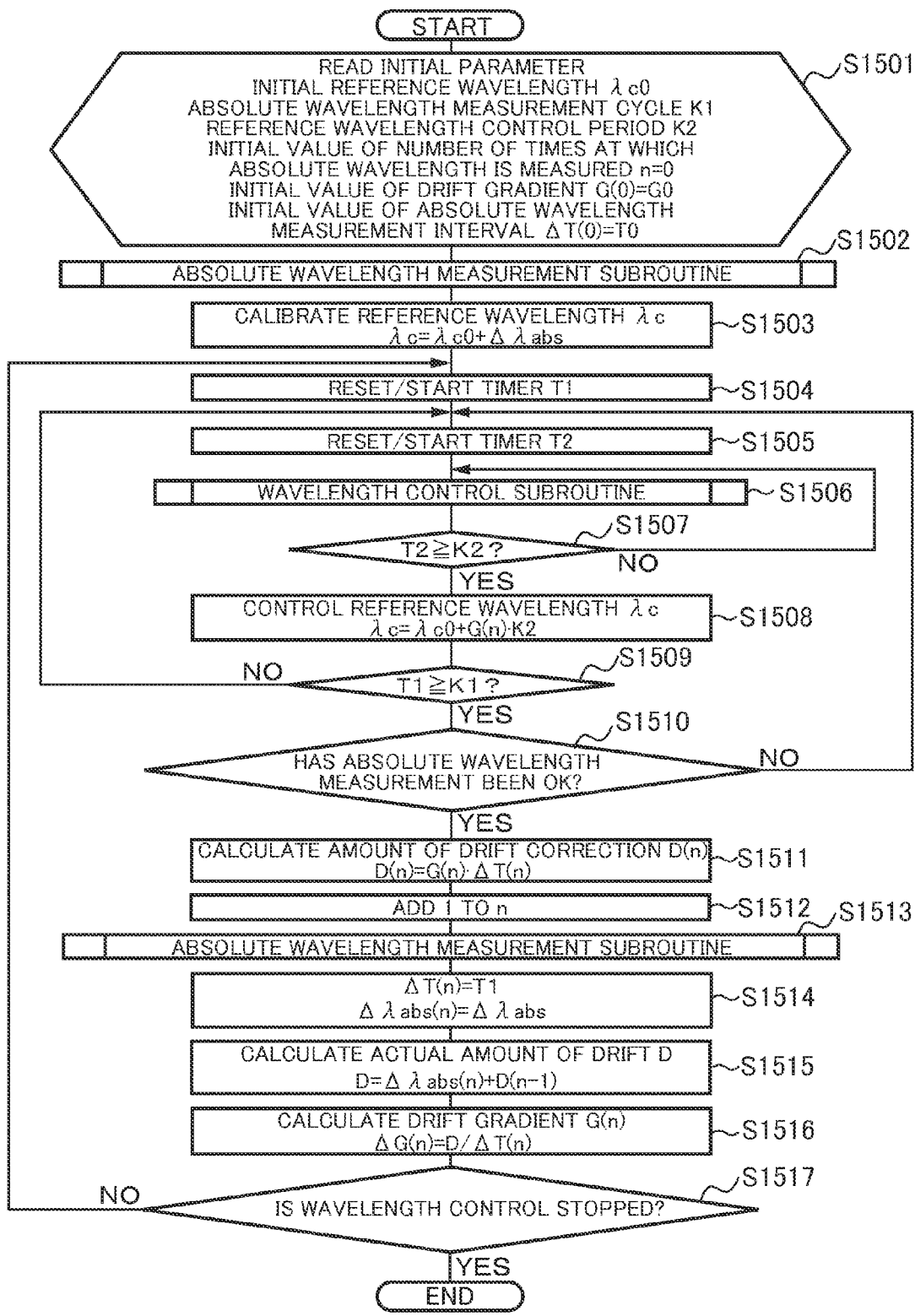
FIG. 15 is a flowchart illustrating the method of controlling the wavelength of a laser beam according to Embodiment 3.

FIG. 15 is a flowchart illustrating the method of controlling the wavelength of a laser beam according to Embodiment 3.

In step S1501, the wavelength controller 61 may read initial parameters for a process performed by the wavelength controller 61. The initial parameters may include the same parameters as in the step S1101 of FIG. 11. The initial parameters may additionally include the initial value of the time interval ΔT(0) for which the absolute wavelength of the laser beam is measured. In the step S1101 of FIG. 11, the initial value of the drift gradient G(0) may be set to zero. Here, in step S1501, the initial value of the drift gradient G(0) may be set to a value other than zero. Similarly, the initial value of the time interval ΔT(0) for which the absolute wavelength of the laser beam is measured be set to a value other than zero.

Step S1502 may be the same as the step S1102 of FIG. 11.
Step S1503 may be the same as the step S1103 of FIG. 11.
Step S1504 may be the same as the step S1104 of FIG. 11.
Step S1505 may be the same as the step S1105 of FIG. 11.
Step S1506 may be the same as the step S1106 of FIG. 11.
Step S1507 may be the same as the step S1107 of FIG. 11.
Step S1508 may be the same as the step S1108 of FIG. 11.
Step S1509 may be the same as the step S1109 of FIG. 11.
Step S1510 may be the same as the step S1110 of FIG. 11.

In step S1511, the wavelength controller 61 may calculate amount of the correction of the drift D (n) by multiplying the drift gradient G(n) by the time interval ΔT(n) for which the absolute wavelength of the laser beam is measured. The drift gradient G(n) and the time interval ΔT(n) for which the absolute wavelength of the laser beam is measured will be defined later.

Step S1512 may be the same as the step S1111 of FIG. 11.
Step S1513 may be the same as the step S1112 of FIG. 11.
Step S1514 may be the same as the step S1113 of FIG. 11.

In step S1515, the wavelength controller 61 may calculate the actual amount of the drift D by adding the amount of the correction of the drift D(n−1) that is a value obtained by taking into account that one has been added to n in the step S1512, to the λabs(n) obtained in the step S1514.

In step S1516, the waveform controller 61 may calculate drift gradient ΔG(n) for adjusting the reference wavelength λc of the laser beam based on the actual amount of the drift obtained in the step S1515, according to an equation ΔG(n)= D/ΔT(n).

Step S1517 may be the same as the step S1115 of FIG. 11.

According to Embodiment 3, the initial value of the drift gradient G(0)=G0 may be used in the step S1501, instead of the initial value of the drift gradient G(0)=0 shown in FIG. 11. The reference wavelength λc of the laser beam may be adjusted as well until the absolute wavelength of the laser beam is first measured since the start of the measurement of the time interval ΔT(n) for which the absolute wavelength of the laser beam is measured. It may be possible to reduce the differences Δλabs(1), Δλabs(2), . . . , Δλabs(n) between the reference wavelength $\lambda c$ and the absolute wavelength of the laser beam at the first, second, . . . , n-th measurements, respectively.

3.4 Embodiment 4

Figure 16:
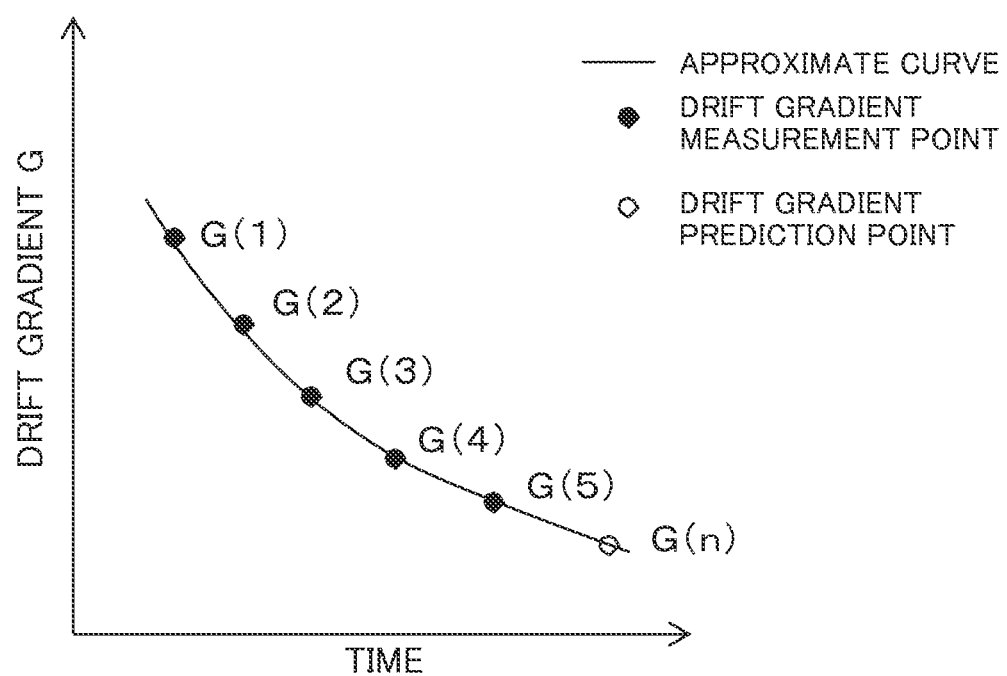
FIG. 16 is a drawing illustrating the method of controlling the wavelength of a laser beam according to Embodiment 4.

FIG. 16 is a drawing illustrating the method of controlling the wavelength of a laser beam according to Embodiment 4.

As illustrated in FIG. 16, the drift gradient G(n) may fluctuate over time. The wavelength controller 61 may calculate a prediction point of the drift gradient, from a plurality of drift gradient measurement points, based on the measured value of the difference $\Delta\lambda abs$ between the reference wavelength $\lambda c$ and the absolute wavelength of the laser beam. An approximate curve for the plurality of drift gradient measurement points may be calculated by the least squares method. The prediction point of the drift gradient may be calculated based on the approximate curve by the extrapolation method. The wavelength controller 61 may obtain not only the last measured value of the difference $\Delta\lambda abs$ between the reference wavelength $\lambda c$ and the absolute wavelength of the laser beam, but also the prediction point of the drift gradient after the measurement, from the plurality of drift gradient measurement points. It may be possible to improve the accuracy of the value of the drift gradient, and therefore to improve the control of the reference wavelength $\lambda c$ of the laser beam.

Figure 17:
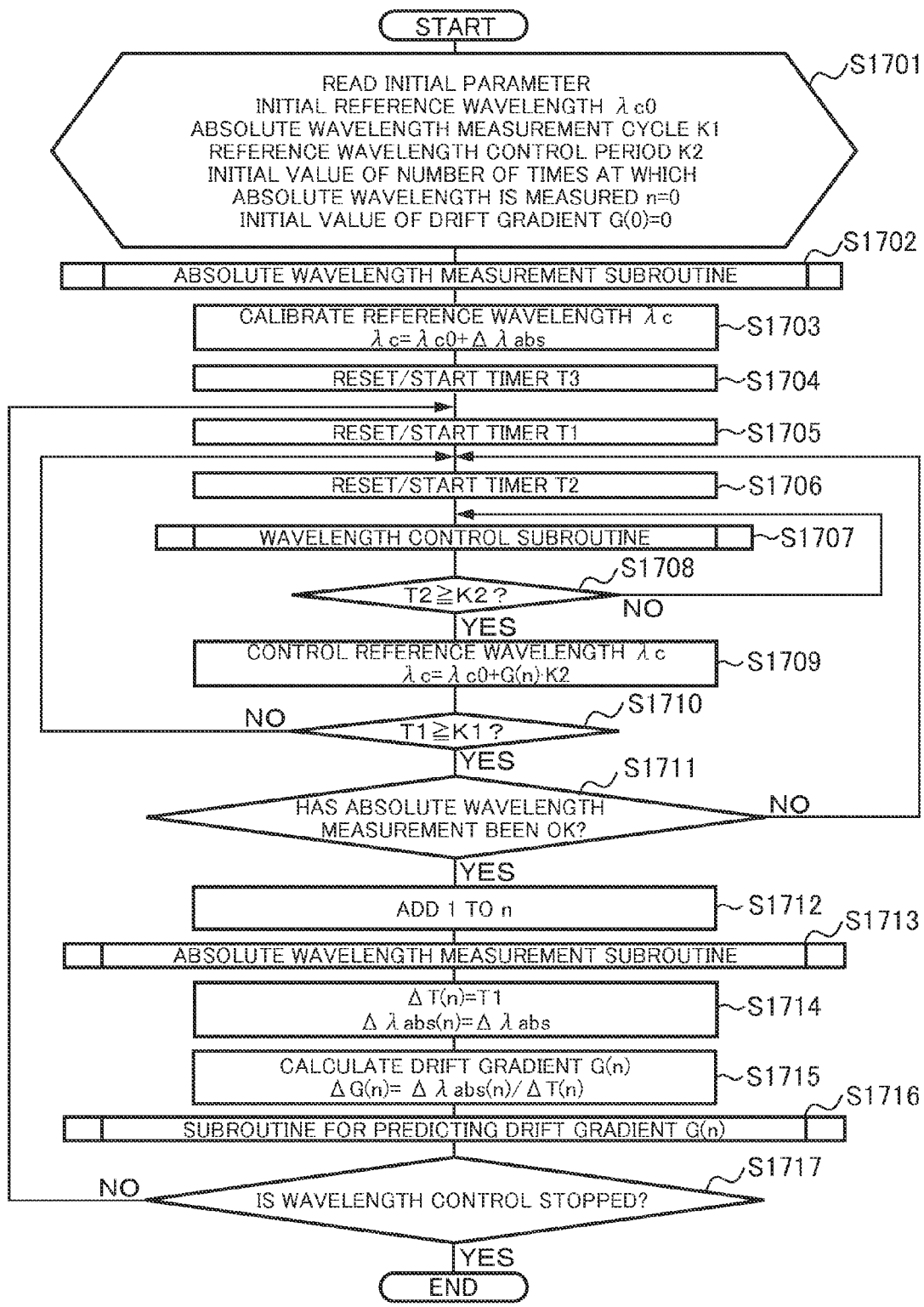
FIG. 17 is a flowchart illustrating the method of controlling the wavelength of a laser beam according to Embodiment 4.

FIG. 17 is a flowchart illustrating the method of controlling the wavelength of a laser beam according to Embodiment 4.

Step S1701 may be the same as the step S1101 of FIG. 11.
Step S1702 may be the same as the step S1102 of FIG. 11.
Step S1703 may be the same as the step S1103 of FIG. 11.

In step S1704, the waveform controller 61 may reset the timer that measures the period of time since the start of the measurement of the time interval for which the absolute wavelength of the laser beam is measured, and start measuring time T3 since the start of the measurement of the time interval for which the absolute wavelength of the laser beam is measured.

Step S1705 may be the same as the step S1104 of FIG. 11.
Step S1706 may be the same as the step S1105 of FIG. 11.
Step S1707 may be the same as the step S1106 of FIG. 11.
Step S1708 may be the same as the step S1107 of FIG. 11.
Step S1709 may be the same as the step S1108 of FIG. 11.
Step S1710 may be the same as the step S1109 of FIG. 11.
Step S1711 may be the same as the step S1110 of FIG. 11.
Step S1712 may be the same as the step S1111 of FIG. 11.
Step S1713 may be the same as the step S1112 of FIG. 11.
Step S1714 may be the same as the step S1113 of FIG. 11.
Step S1715 may be the same as the step S1114 of FIG. 11.

In step 1716, the wavelength controller 61 may execute a subroutine for calculating a predicted value of the drift gradient G(n) (hereinafter "drift gradient predicting subroutine"), based on the plurality of values of the drift gradient G(n) calculated in the step S1715.

Step S1717 may be the same as the step S1115 of FIG. 11.

According to Embodiment 4, the predicted value of the drift gradient G(n) obtained based on the plurality of values of the drift gradient G(n) may be used, instead of the drift gradient G(n) calculated in the step S1715. It may be possible to improve the accuracy of the value of the drift gradient, and therefore to improve the control of the reference wavelength $\lambda c$ of the laser beam.

Figure 18:
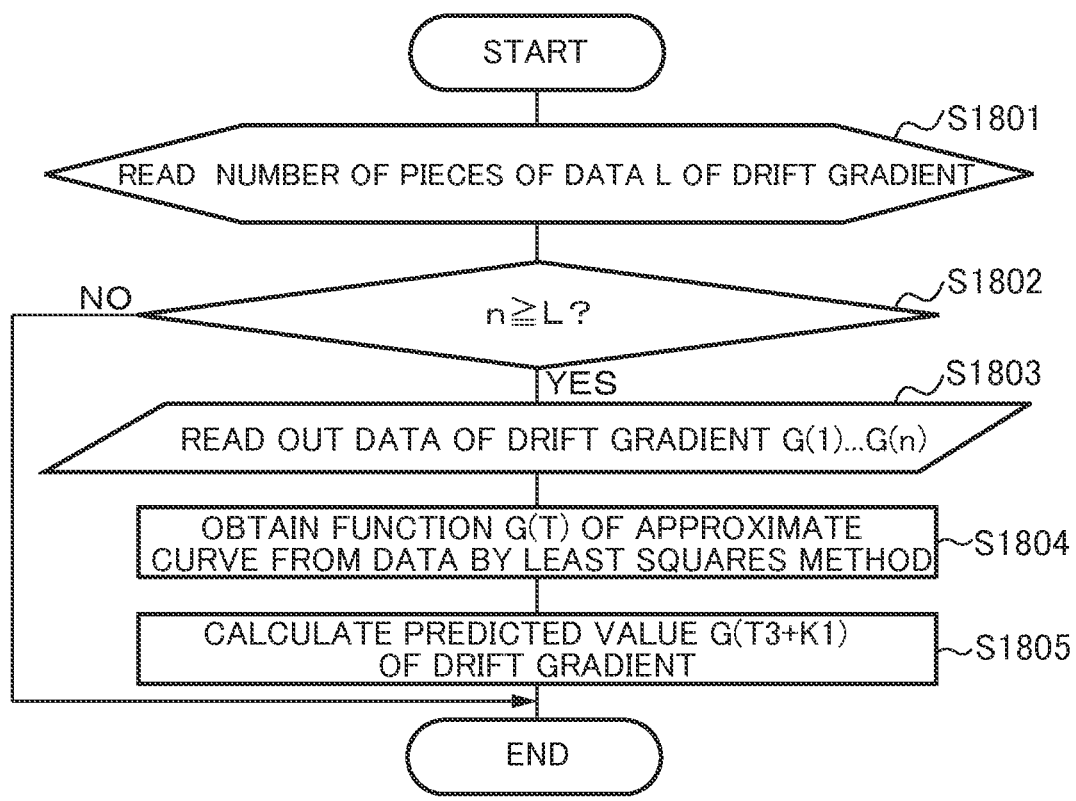
FIG. 18 is a flowchart illustrating a subroutine for predicting drift gradient G(n) in the method of controlling the wavelength of a laser beam according to Embodiment 4.

FIG. 18 is a flowchart illustrating the drift gradient predicting subroutine in the method of controlling the wavelength of a laser beam according to Embodiment 4.

In step S1801, the wavelength controller 61 may read the number of pieces of data L having to be used to predict the drift gradient G(n). Here, L may be an integer equal to or more than three.

In step S1802, the wavelength controller 61 may determine whether or not the number of pieces of data n of the drift gradient G(n) is equal to or greater than the number of pieces of data L having to be used to predict the drift gradient G(n). When the number of pieces of data n of the drift gradient G(n) is equal to or greater than the number of pieces of data L having to be used to predict the drift gradient G(n) (n≥L), the wavelength controller 61 may move the step to step S1803. On the other hand, when the number of pieces of data n of the drift gradient G(n) is smaller than the number of pieces of data L having to be used to predict the drift gradient G(n) (n<L), the wavelength controller 61 may end the drift gradient predicting subroutine.

In the step S1803, the wavelength controller 61 may read n pieces of data of the drift gradients G(1) G(n).

In step S1804, the wavelength controller 61 may obtain a function G(T) of the approximate curve of the n pieces of data of the drift gradients G(1) G(n) by the least squares method.

In step S1805, the wavelength controller 61 may calculate a predicted value of the drift gradient G(T3+K1) during the period of time since the start of the measurement of the time interval for which the absolute wavelength of the laser beam is measured, by using the function G(T) of the approximate curve.

3.5 Embodiment 5

Figure 19:
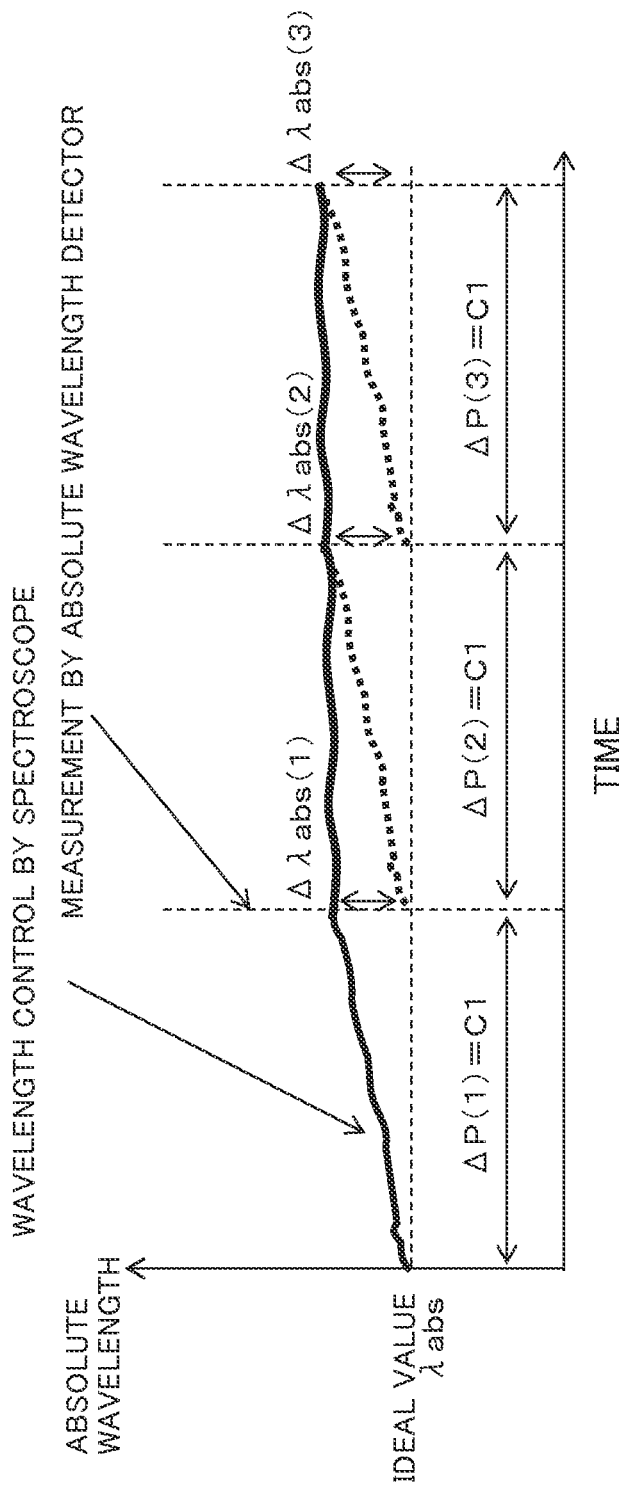
FIG. 19 is a drawing illustrating the method of controlling the wavelength of a laser beam according to Embodiment 5.

FIG. 19 is a drawing illustrating the method of controlling the wavelength of a laser beam according to Embodiment 5.

As illustrated in FIG. 19, the number of pulses until the first measurement, the number of pulses between the first and second measurements, the number of pulses between the previous and n-th measurements of the absolute wavelength of the laser beam may be calculated as $\Delta P(1), \Delta P(2), \ldots, \Delta P(n)$, respectively. The reference wavelength $\lambda c$ of the laser beam may be initially calibrated to the ideal value $\lambda abs$ of the wavelength of the laser beam, and the differences between the reference wavelength $\lambda c$ set for the spectroscope 70 and the absolute wavelength of the laser beam at the first, second, . . . , n-th measurements may be calculated as $\Delta\lambda abs(1), \Delta\lambda abs(2), \Delta\lambda abs(n)$, respectively.

The reference wavelength $\lambda c$ of the laser beam may be adjusted based on the difference $\Delta\lambda abs(n)$ between the reference wavelength $\lambda c$ and the absolute wavelength of the laser beam, at a time interval shorter than the number of pulses $\Delta P(n)$ for which the absolute wavelength of the laser beam is measured. The reference wavelength $\lambda c$ of the laser beam may be adjusted after the absolute wavelength of the laser beam is first measured since the start of the measurement of the number of pulses for which the absolute wavelength of the laser beam is measured, that is, may be adjusted for $\Delta P(2), \ldots, \Delta P(n)$.

The reference wavelength $\lambda c$ of the laser beam may be adjusted with the gradient for the number of pulses being substantially the same as the drift gradient of the reference wavelength $\lambda c$ of the laser beam for the number of pulses for which the absolute wavelength of the laser beam is measured. The gradient for the number of pulses to adjust the reference wavelength $\lambda c$ of the laser beam may be referred to as the control gradient.

The reference wavelength $\lambda c$ of the laser beam may be adjusted with the control gradient smaller than the drift gradient of the reference wavelength $\lambda c$ of the laser beam.

The amount of the variation in the drift of the reference wavelength $\lambda c$ of the laser beam may be substantially the same as the difference ($\Delta\lambda abs(1)$, $\Delta\lambda abs(2)$, ..., $\Delta\lambda abs(n)$) between the reference wavelength $\lambda c$ and the absolute wavelength of the laser beam.

Since the reference wavelength $\lambda c$ of the laser beam is adjusted with the control gradient equal to or smaller than the drift gradient of the reference wavelength $\lambda c$ of the laser beam, it may be possible to reduce the variation in $\Delta\lambda abs(n)$ of the reference wavelength $\lambda c$ of the laser beam. Since the variation in $\Delta\lambda abs(n)$ of the reference wavelength $\lambda c$ of the laser beam is reduced, it may be possible to reduce the variation in $\Delta\lambda abs(n)$ of the wavelength $\lambda$ of the laser beam. Accordingly, it may be possible to reduce the effect on the adjustment of the wavelength $\lambda$ of the laser beam used in the exposure device 91.

Figure 20:
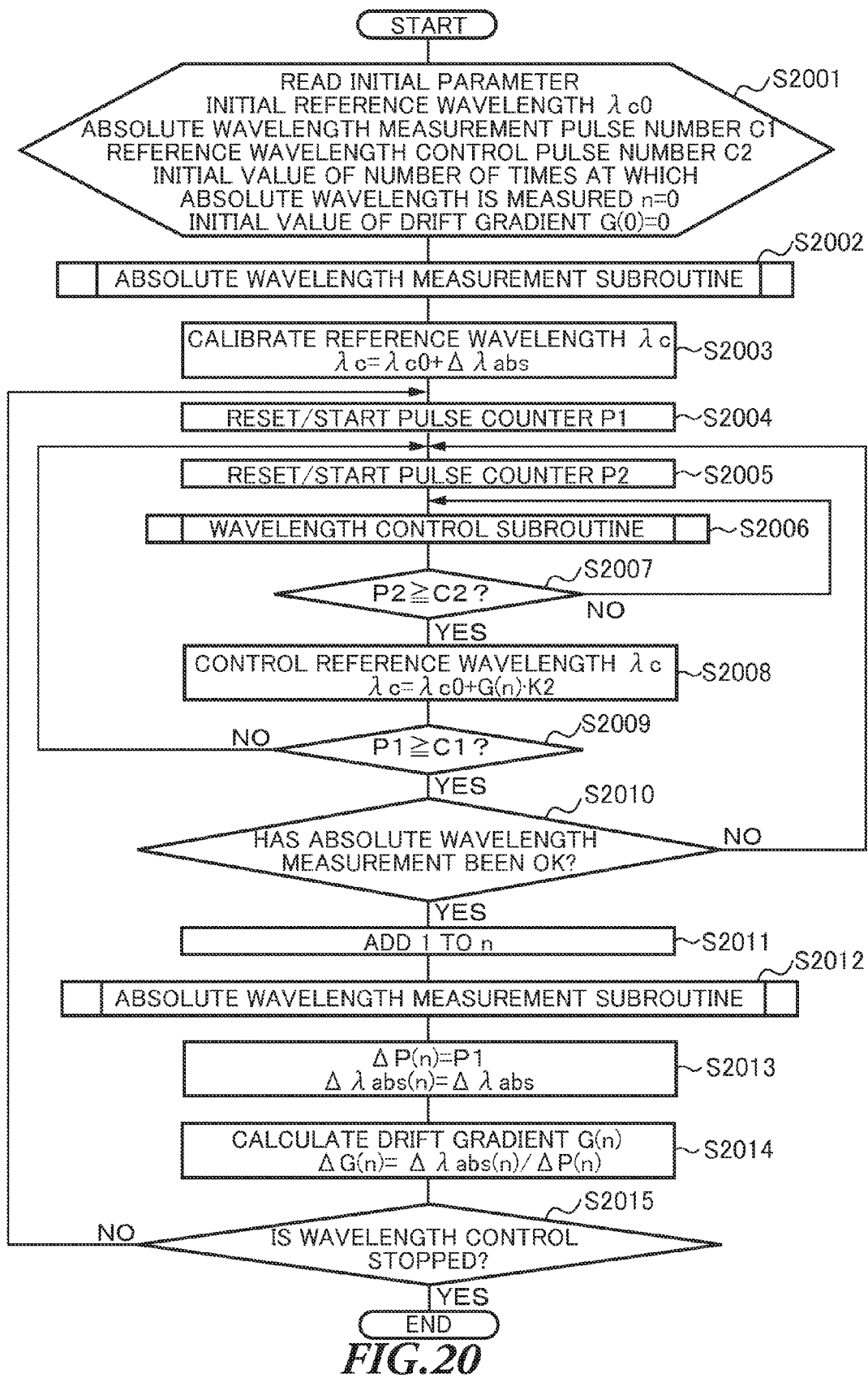
FIG. 20 is a flowchart illustrating the method of controlling the wavelength of a laser beam according to Embodiment 5.

FIG. 20 is a flowchart illustrating the method of controlling the wavelength of a laser beam according to Embodiment 5.

In step S2001, the wavelength controller 61 may read initial parameters for a process performed by the wavelength controller 61. Similarly to the step S401 of FIG. 4, the initial parameters may include the initial reference wavelength $\lambda c0$ of the laser beam set for the spectroscope 70. The initial parameters may additionally include cycle C1 for which the absolute wavelength of the laser beam is measured (the number of pulses for which the absolute wavelength is measured), the number of pulses C2 for which the reference wavelength is controlled, the initial value n of the number of times at which the absolute wavelength is measured, and the initial value of the drift gradient G(0). The number of pulses C2 for which the reference wavelength is controlled may be within a range from one-thousandth or more of the number of pulses C1 for which the absolute wavelength is measured to one-hundredth or less of the number of pulses C1 for which the absolute wavelength is measured. The initial value n of the number of times at which the absolute wavelength is measured may be set to zero. The initial value of the drift gradient G (0) may be set to zero.

Step S2002 may be the same as the step S402 of FIG. 4.
Step S2003 may be the same as the step S403 of FIG. 4.

In step S2004, the wavelength controller 61 may reset a pulse counter that measures the number of pulses for which the absolute wavelength of the laser beam is controlled, and start measuring the number of pulses P1 after the previous measurement of the absolute wavelength of the laser beam.

In step S2005, the wavelength controller 61 may reset a pulse counter that measures the period of time for which the reference wavelength $\lambda c$ of the laser beam is controlled, and start measuring the number of pulses P2 after the previous control of the reference wavelength $\lambda c$ of the laser beam.

Step S2006 may be the same as the step S405 of FIG. 4.

In step S2007, the wavelength controller 61 may determine whether or not the number of pulses P2 after the previous control of the reference wavelength $\lambda c$ of the laser beam is equal to or greater than the number of pulses C2 for which the reference wavelength is controlled. When P2 is smaller than C2 (P2<C2), the wavelength controller 61 may move the step back to the step S2006, and repeat the wavelength subroutine to continue to control the wavelength $\lambda$ of the laser beam. On the other hand, when P2 is equal to or greater than C2 (P2≥C2), the wavelength controller 61 may stop executing the wavelength control subroutine, and move the step to step S2008.

In the step S2008, the wavelength controller 61 may control the reference wavelength $\lambda c$ of the laser beam. The wavelength controller 61 may add a value obtained by multiplying the drift gradient G(n) defined later by the number of pulses C2 for which the reference wavelength is controlled, to the reference wavelength $\lambda c$ of the laser beam.

In step S2009, the wavelength controller 61 may determine whether or not the number of pulses P1 after the previous measurement of the absolute wavelength of the laser beam is equal to or greater than the number of pulses C1 for which the absolute wavelength is measured. When P1 is smaller than C1 (P1<C1), the wavelength controller 61 may move the step back to the step S2005, and repeat the wavelength control subroutine to continue to control the wavelength $\lambda$ of the laser beam. On the other hand, when P1 is equal to or greater than C1 (P1≥C1), the wavelength controller 61 may stop executing the wavelength control subroutine, and move the step to step S2010.

The step S2010 may be the same as the step S407 of FIG. 4.

In step S2011, the wavelength controller 61 may add one to the number of times n at which the absolute wavelength is measured.

Step S2012 may be the same as the step S408 of FIG. 4. The wavelength controller 61 may calculate the difference $\Delta\lambda abs$ between the reference wavelength $\lambda c$ and the absolute wavelength of the laser beam.

In step S2013, the wavelength controller 61 may substitute the value of P1 for the number of pulses $\Delta P(n)$ for which the absolute wavelength of the laser beam is measured, and also substitute $\Delta\lambda abs$ for the difference $\Delta\lambda abs(n)$ between the reference wavelength $\lambda c$ and the absolute wavelength of the laser beam. $\Delta P(n)$ may be substantially constant with respect to n. $\Delta\lambda abs(n)$ may be substantially constant with respect to n.

In step S2014, the wavelength controller 61 may calculate the drift gradient G(n). The drift gradient G(n) may be defined by the number of pulses $\Delta P(n)$ for which the absolute wavelength of the laser beam is measured, and the difference $\Delta\lambda abs(n)$ between the reference wavelength $\lambda c$ and the absolute wavelength of the laser beam. The drift gradient G(n) may be defined by an expression $\Delta\lambda abs(n)/\Delta P(n)$. G(n) may be substantially constant with respect to n.

Step S2015 may be the same as the step S410 of FIG. 4.

According to Embodiment 5, the step S2008 and so forth are provided, instead of the step S409 of FIG. 4, and therefore it may be possible to reduce the variation in the reference wavelength $\lambda c$ of the laser beam. $\Delta\lambda abs$ is not added to the reference wavelength $\lambda c$ of the laser beam, but a value being approximately the same as $\Delta\lambda abs \times (C2/C1)$ is added to the reference wavelength $\lambda c$ of the laser beam. By this means, it may be possible to reduce the variation in the reference wavelength $\lambda c$ of the laser beam from $\Delta\lambda abs$ to $\Delta\lambda abs \times (C2/C1)$.

Figure 21:
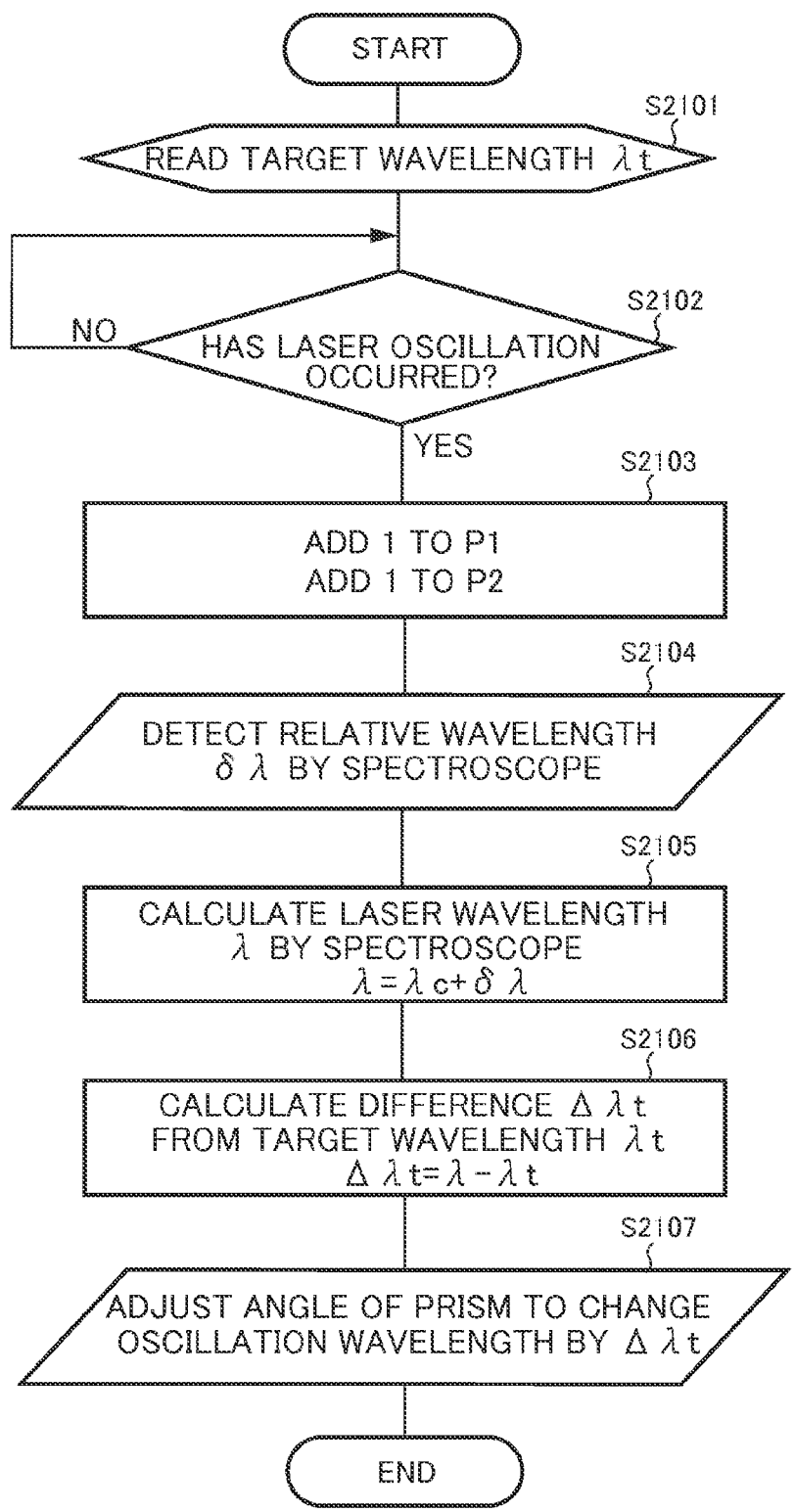
FIG. 21 is a flowchart illustrating a wavelength control subroutine in the method of controlling the wavelength of a laser beam according to Embodiment 5.

FIG. 21 is a flowchart illustrating the wavelength control subroutine in the method of controlling the wavelength of a laser beam according to Embodiment 5.

Step S2101 may be the same as the step S801 of FIG. 8.
Step S2102 may be the same as the step S802 of FIG. 8.

When laser oscillation occurs in the step S2102, in step S2103, the wavelength controller 61 may add one to the number of pulses P1 after the previous measurement of the absolute wavelength of the laser beam, and also add one to the number of pulses P2 after the previous control of the reference wavelength $\lambda c$ of the laser beam.

Step S2104 may be the same as the step S803 of FIG. 8.
Step S2105 may be the same as the step S804 of FIG. 8.
Step S2106 may be the same as the step S805 of FIG. 8.
Step S2107 may be the same as the step S806 of FIG. 8.

The wavelength controller 61 may increment the number of pulses P1 after the previous measurement of the absolute wavelength of the laser beam and the number of pulses P2 after the previous control of the reference wavelength λc of the laser beam.

In the flowcharts illustrated in FIGS. 13, 15 and 17, the timer may be substituted for a pulse counter. K1, K2, and K3 may be substituted for C1 and C2.

The above-described embodiments and the modifications thereof are merely examples for implementing the present disclosure, and the present disclosure is not limited thereto. Making various modifications according to the specifications or the like falls within the scope of the present disclosure, and it is apparent from the above description that other various embodiments are possible within the scope of the present disclosure.

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

REFERENCE SIGNS LIST 10 laser chamber
11 first window
12 second window
13 electrode
14 electrode
21 output coupling mirror
22 first beam splitter
23 second beam splitter
24 third beam splitter
25 first reflecting mirror
31 laser exit shutter
32 shutter driver
40 optical sensor
50 line narrowing module
51 prism
52 grating
53 rotation stage
61 wavelength controller
62 laser controller
63 first driver
70 spectroscope
71 first diffuser element
72 monitor etalon
73 first condenser lens
74 image sensor
80 absolute wavelength detector
81 uniaxial stage
82 second reflecting mirror
83 second driver
84 laser galvatron
84a anode
84b cathode
85 optical system
85a second diffuser element
85b second condenser lens
85c pinhole
85d lens
86 optogalvanic signal detecting circuit
87 galvatron power supply
88 first damper
89 second damper
90 wavelength detection system
91 exposure device
100 line narrowing laser apparatus

The invention claimed is:

1. A method of controlling a wavelength of a laser beam, comprising:
    measuring a relative wavelength of the laser beam with respect to a reference wavelength by using a spectroscope;
    controlling a line narrowing module based on a difference between a target wavelength and a sum of the relative wavelength and the reference wavelength, so as to change the wavelength of the laser beam by the difference;
    measuring an absolute wavelength of the laser beam at a first interval by using an absolute wavelength detector; and
    adjusting the reference wavelength of the laser beam at a second interval that is shorter than the first interval;
    wherein the adjusting the reference wavelength of the laser beam includes obtaining a gradient by calculating a difference between the reference wavelength and the absolute wavelength of the laser beam for the first interval, and adjusting the reference wavelength of the laser beam based on a value obtained by multiplying the gradient by the second interval.

2. The method according to claim 1, wherein the first interval is set according to time.

3. The method according to claim 1, wherein the first interval for which the absolute wavelength of the laser beam is measured is set according to a number of pulses of the laser beam.

4. The method according to claim 1, wherein the adjusting the reference wavelength of the laser beam includes adjusting the reference wavelength of the laser beam by a value obtained by multiplying the gradient by the first interval for which the absolute wavelength of the laser beam is measured.

5. The method according to claim 1, wherein the adjusting the reference wavelength of the laser beam includes adjusting the reference wavelength of the laser beam by a value greater than a value obtained by multiplying the gradient by the first interval for which the absolute wavelength of the laser beam is measured.

6. The method according to claim 1, wherein the adjusting the reference wavelength of the laser beam is performed after first measuring the absolute wavelength of the laser beam since a start of a measurement of the first interval.

7. The method according to claim 1, wherein the adjusting the reference wavelength of the laser beam includes:
    adjusting the reference wavelength of the laser beam with a predetermined gradient for the first interval for which the absolute wavelength of the laser beam is measured, until first measuring the absolute wavelength of the laser beam since a start of a measurement of the first interval for which the absolute wavelength of the laser beam is measured; and
    adjusting a gradient of the difference between the reference wavelength and the absolute wavelength of the laser beam, for the first interval for which the absolute wavelength of the laser beam is measured, based on the predetermined gradient.

8. The method according to claim 1, wherein the adjusting the reference wavelength of the laser beam includes:
    calculating a predicted value of a gradient of the difference between the reference wavelength and the absolute wavelength of the laser beam for the first interval for which the absolute wavelength of the laser beam is measured, based on an actual measurement value of the gradient of the difference between the reference wavelength and the absolute wavelength of the laser beam, for the first interval for which the absolute wavelength of the laser beam is measured; and adjusting the gradient of the difference between the reference wavelength and the absolute wavelength of the laser beam for the first interval for which the absolute wavelength of the laser beam is measured, based on the predicted value.

9. The method according to claim 1, wherein adjusting the reference wavelength of the laser beam includes adjusting the reference wavelength of the laser beam by adding the value obtained by multiplying the gradient by the second interval to the reference wavelength of the laser beam.

10. The method according to claim 1, wherein the second interval is within a range from K1/1000 or more to K1/100 or less, where K1 represents the first interval.

11. The method according to claim 1, wherein the relative wavelength of the laser beam with respect to the reference wavelength is represented by $\alpha r^2$, where r represents a radius of an interference pattern of the laser beam detected by the spectroscope and a represents a proportional constant.

12. The method according to claim 11, wherein the reference wavelength is a wavelength of the laser beam when intensity of the interference pattern is maximized at r=0.

13. The method according to claim 11, wherein the spectroscope is an etalon spectrometer that includes a diffuser element, a monitor etalon, a condenser lens, and an image sensor.

14. The method according to claim 1, wherein the absolute wavelength detector includes a laser galvatron and an optogalvanic signal detection circuit, and the absolute wavelength detector measures the absolute wavelength of the laser beam by detecting a wavelength at a peak of the intensity of the optogalvanic signal.

15. A laser apparatus comprising:
a laser resonator configured to output a laser beam;
a spectroscope configured to measure a relative wavelength of the laser beam with respect to a reference wavelength of the laser beam;
a line narrowing module configured to change a wavelength of the laser beam;
an absolute wavelength detector configured to measure an absolute wavelength of the laser beam; and
a controller configured to control the line narrowing module based on a difference between a target wavelength and a sum of the relative wavelength and the reference wavelength, so as to change the wavelength of the laser beam by the difference, to control the absolute wavelength detector to measure the absolute wavelength of the laser beam at a first interval, and to adjust the reference wavelength of the laser beam at a second interval that is shorter than the first interval;
wherein the controller obtains a gradient by calculating a difference between the reference wavelength and the absolute wavelength of the laser beam for the first interval, and adjusts the reference wavelength of the laser beam based on a value obtained by multiplying the gradient by the second interval.

16. The laser apparatus according to claim 15, wherein the controller adjusts the reference wavelength of the laser beam after first measuring the absolute wavelength of the laser beam since a start of a measurement of the first interval.

17. The laser apparatus according to claim 15, wherein the controller adjusts the reference wavelength of the laser beam by adding the value obtained by multiplying the gradient by the second interval to the reference wavelength of the laser beam.

18. The laser apparatus according to claim 15, wherein the second interval is within a range from K1/1000 or more to K1/100 or less, where K1 represents the first interval.

19. The laser apparatus according to claim 15, wherein the relative wavelength of the laser beam with respect to the reference wavelength is represented by $\alpha r^2$, where r represents a radius of an interference pattern of the laser beam detected by the spectroscope and a represents a proportional constant.

20. The laser apparatus according to claim 19, wherein the reference wavelength is a wavelength of the laser beam when intensity of the interference pattern is maximized at r=0.

21. The laser apparatus according to claim 19, wherein the spectroscope is an etalon spectrometer that includes a diffuser element, a monitor etalon, a condenser lens, and an image sensor.

22. The laser apparatus according to claim 15, wherein the absolute wavelength detector includes a laser galvatron and an optogalvanic signal detection circuit, and the absolute wavelength detector measures the absolute wavelength of the laser beam by detecting a wavelength at a peak of the intensity of the optogalvanic signal.

* * * * *